United States Patent

(12) United States Patent
Ito

(10) Patent No.: US 8,768,168 B2
(45) Date of Patent: Jul. 1, 2014

(54) OPTICAL SIGNAL TRANSMISSION SYSTEMS, TRANSMITTERS, RECEIVERS, AND OPTICAL SIGNAL TRANSMISSION METHOD

(75) Inventor: Toshiharu Ito, Tokyo (JP)

(73) Assignee: NEC Corporation, Tokyo (JP)

(*) Notice: Subject to any disclaimer, the term of this patent is extended or adjusted under 35 U.S.C. 154(b) by 200 days.

(21) Appl. No.: 13/060,577

(22) PCT Filed: Aug. 26, 2009

(86) PCT No.: PCT/JP2009/064833
§ 371 (c)(1),
(2), (4) Date: Feb. 24, 2011

(87) PCT Pub. No.: WO2010/026894
PCT Pub. Date: Mar. 11, 2010

(65) Prior Publication Data
US 2011/0150465 A1   Jun. 23, 2011

(30) Foreign Application Priority Data
Sep. 3, 2008   (JP) .................... 2008-226008

(51) Int. Cl.
H04J 14/06   (2006.01)
(52) U.S. Cl.
USPC .............................. 398/65; 398/152; 398/184
(58) Field of Classification Search
USPC ............ 398/65, 147, 150, 152, 184, 188, 199
See application file for complete search history.

(56) References Cited

U.S. PATENT DOCUMENTS

| | | | | |
|---|---|---|---|---|
| 7,529,490 | B2* | 5/2009 | Hoshida | 398/207 |
| 7,936,993 | B2* | 5/2011 | Ooi et al. | 398/81 |
| 8,116,635 | B2* | 2/2012 | Tanimura et al. | 398/184 |
| 8,244,138 | B2* | 8/2012 | Hoshida et al. | 398/184 |
| 2005/0013618 | A1* | 1/2005 | Kurebayashi | 398/188 |
| 2007/0274728 | A1* | 11/2007 | Bergano et al. | 398/152 |
| 2010/0002281 | A1* | 1/2010 | McDonald | 359/240 |
| 2010/0183309 | A1* | 7/2010 | Etemad et al. | 398/79 |

FOREIGN PATENT DOCUMENTS

| | | |
|---|---|---|
| CN | 1757185 A | 4/2006 |
| JP | 62-24731 A | 2/1987 |
| JP | 3-171036 A | 7/1991 |
| JP | 4-117036 A | 4/1992 |
| JP | 8-111662 A | 4/1996 |
| JP | 9-167998 A | 6/1997 |

(Continued)

OTHER PUBLICATIONS

Japanese Office Action for JP 2010-527757 mailed on Jun. 18, 2013 with Partial English Translation.
Chinese Office Action for CN Application No. 200980134499.2 issued on May 31, 2013 with English Translation.

(Continued)

Primary Examiner — Dzung Tran
(74) Attorney, Agent, or Firm — Sughrue Mion, PLLC

(57) ABSTRACT

An optical signal transmission system comprises a transmitter that phase-modulates two optical signals of a same frequency by asymmetrically chirping the two optical signals, combines the two optical signals that have been phase-modulated as polarization components according to polarization multiplexing, and transmits an optical signal that has been combined and obtained; and a receiver that receives said optical signal from said transmitter, compresses pulses of at least one of the polarization components of the optical signal, and splits the optical signal into two polarization components.

20 Claims, 26 Drawing Sheets

(56) References Cited

FOREIGN PATENT DOCUMENTS

| | | |
|---|---|---|
| JP | 9-284218 A | 10/1997 |
| JP | 11-215103 A | 8/1999 |
| JP | 2002344426 A | 11/2002 |
| JP | 2003021816 A | 1/2003 |
| JP | 2003249897 A | 9/2003 |
| JP | 2005065027 A | 3/2005 |
| JP | 2008092123 A | 4/2008 |

OTHER PUBLICATIONS

International Search Report for PCT/JP2009/064833 mailed Nov. 24, 2009.
A. H. Gnauck et al., "One Terabit/s Transmission Experiment", OFC1996, PD20-1.
S. Chandrasekhar et al., "Hybrid 107-Gb/s Polarization—Multiplexed DQPSK and 42.7-Gb/s DQPSK Transmission at 1,4-bit/s/Hz Spectral Efficiency over 1280km of SSMF and 4 Bandwidth-Managed ROADMs", ECOC2007, PD1.9.

* cited by examiner

OPTICAL SIGNAL TRANSMISSION SYSTEMS, TRANSMITTERS, RECEIVERS, AND OPTICAL SIGNAL TRANSMISSION METHOD

TECHNICAL FIELD

The present invention relates to optical signal transmission technologies that use a polarization multiplexing system.

BACKGROUND ART

In backbone optical fiber communication transmission systems, the wavelength multiplexing optical transmission technology has been used. This technology discretely allocates signals to a plurality of different wavelengths over one transmission line fiber so as to realize a large capacity.

In this wavelength multiplexing transmission technology, the realization of narrow wavelength intervals for large capacity depends on the transmission speeds of signal lights allocated to individual wavelengths. Thus, the wavelength intervals are decided by signal speeds that are dominant when the system operations are started. For example, the current dominant 50 GHz interval and 100 GHz interval have been decided on the basis of the spectrum width of a 10 Gb/s (bit/second) signal light.

If higher speed signal lights, for example, 40 Gb/s and 100 Gb/s signals, are tried to be introduced for such a system in which a wavelength interval has been decided, various problems will arise. For example, because the spectrum of a high speed signal light widens, it does not fit the wavelength interval, resulting in the occurrence of a crosstalk to adjacent channels.

Thus, when a signal light that is faster than the speed that was estimated when the system operation was started (for example, 40 Gb/s or faster) is introduced, it is important to apply a modulation system that compresses the spectrum width and a data superimposing system to the existing system such that the signal light spectrum fits the wavelength interval of the existing wavelength multiplexing transmission system.

Among modulation systems, in particular, the polarization multiplexing and splitting system is a hopeful technology to compress the spectrum width. In the polarization multiplexing and splitting system, on the transmission end, two independent signal lights of the same wavelength are allocated to two polarization axes of an optical fiber to perform polarization multiplexing, whereas on the reception end after transmission, the multiplexed signal light is split again into two polarization components (polarization splitting) and they are individually received.

This polarization multiplexing and splitting system has been implemented for a long time and was used in an experiment reported in 1996 as the first 1-tera bits/fiber transmission experiment in the world as described in Non-Patent Document 1.

In the experiment described in Non-Patent Document 1, an objective of polarization multiplexing was to share one wavelength by two signal lights, namely improve frequency usage efficiency. In contrast, the current interest as to polarization multiplexing is in that one data sequence is split into two parts (for example, a data sequence of 100 Gb/s is split into two data sequences of 50 Gb/s) and the split data sequences are allocated to the individual polarization components so as to compress the spectrum width.

When one data sequence is split into two sequences, they are not independent, for example, the data speeds of signal lights allocated to two polarization components are not perfectly the same; however, instead, this characteristic in which the data speeds of these data sequences are the same is often positively used.

For example, as described in Non-Patent Document 2, in the pulse interleave polarization multiplexing in which two polarization components are individually RZ (return-to-zero) formatted and are allocated such that the peak positions of RZ pulses are shifted by a half bits therebetween, the characteristic of which the data speeds in both the polarization components are the same is used to decrease the occurrence of a linear/nonlinear crosstalk between both the polarization components.

In this circumstance, when polarization multiplexed signal lights were generated in the past, both polarization components were the same with respect to not only the data speed, but also the modulation and demodulation systems. In other words, both polarization components were symmetrical.

In the polarization control of reception side polarization splitting that requires the most advanced technique in the polarization multiplexing and splitting system, this symmetry has been positively used.

For example, in Patent Document 1, as the control rule of polarization splitting, a symbol speed component contained in one of the output components after polarization components is split in order to be maximized. This is also a technology that can be used only when both polarization components are symmetrical.

CITATION LIST

Patent Documents

Patent Document 1: JP2002-344426A

Non-Patent Documents

Non-Patent Document 1: A. H. Anauck et. al., "One Terabit/s Transmission Experiment", OFC 1996, paper PD20.
Non-Patent Document 2: S. Chandrasekhar et. al., "Hybrid 107-Gb/s Polarization—Multiplexed DQPSK and 42.7-Gb/s DQPSK Transmission at 1.4-bit/s/Hz Spectral Efficiency over 1280 km of SSMF and 4 Bandwidth—Managed ROADMs", ECOC 2007, paper—PD 1.9.

SUMMARY OF THE INVENTION

Problems to be Solved by the Invention

However, in the polarization multiplexing and splitting systems described in Non-Patent Document 1, Non-Patent Document 2, or Patent Document 1, there was a problem in which signal quality was easily and remarkably deteriorated because of a polarization dispersion over a transmission line and thereby the transmittable distances was restricted.

In the polarization multiplexing and splitting system, to allow two polarization components multiplexed on the transmission end to be fully split on the reception end, they need to have the orthogonality over a transmission line. Although there is a polarization dispersion to some extent over a transmission line, it destroys the orthogonality of the polarization components. When the orthogonality is destroyed, the reception side is incapable of perfectly splitting the multiplexed light using the polarization multiplexing and thereby a part of one component leaks to the other component as crosstalk. As a result, there was a problem in which the single quality deteriorated.

For example, FIG. 1 shows measurement results that represent how signal quality deteriorates when a primary polarization dispersion (Differential Group Delay) is caused to take place in a 110 Gb/s (2×55 Gb/s) polarization multiplexed RZ-DQPSK signal light. Each polarization component is RZ-formatted with a pulse width of 50% and has been multiplexed according to the pulse interleave polarization multiplexing technique.

In FIG. 1, black circles (●) represent measurement results of a polarization multiplexed polarization multiplexed RZ-DQPSK signal light. The signal light has been mixed with a noise light such that the optical SNR becomes 21 dB/0.1 nm. Assuming that Q value deterioration is targeted to be 3 dB, the polarization dispersion resistance is expected to be around 6 ps.

In FIG. 1, white circles (○) represent measurement results of a single polarization 55 Gb/s RZ-DQPSK signal light that has not been multiplexed according to the polarization multiplexing technique. To match the signal to noise ratio per bit, the optical SNR is assumed to be 18 dB/0.1 nm. In this case, the DGD resistance is estimated to be around 24 ps. From the results, it is clear that the DGD resistance of a single polarization 110 Gb/s RZ-DQPSK signal lights is around 12 ps (the half of 24 ps).

An object of the present invention is to provide technologies that improve signal quality during a transmission of optical signals that use the polarization multiplexing and splitting system.

Means for Solving the Problems

To realize the above-described object, an optical signal transmission system according to the present invention comprises a transmitter that phase-modulates two optical signals of a same frequency by asymmetrically chirping the two optical signals, combines the two optical signals that have been phase-modulated as polarization components according to polarization multiplexing, and transmits an optical signal that has been combined and obtained; and a receiver that receives said optical signal from said transmitter, compresses pulses of at least one of the polarization components of the optical signal, and splits the optical signal into two polarization components.

A transmitter according to the present invention comprises phase modulation means that phase-modulates two optical signals of the same frequency by asymmetrically chirping the two optical signals; and transmission means that combines said two optical signals that have been phase-modulated by said phase modulation means as polarization components according to polarization multiplexing, and transmits the optical signal that has been combined and obtained.

A receiver according to the present invention comprises reception means that receives an optical signal that has been polarization multiplexed; pulse compression means that compresses pulses of at least one of polarization components of said optical signal that has been received by said reception means; and polarization splitting means that splits said optical signal that has been received by said reception means into two polarization components.

An optical signal transmission method according to the present invention comprises phase-modulating two optical signals of the same frequency by asymmetrically chirping the two optical signals; combines the two optical signals that have been phase-modulated as polarization components according to polarization multiplexing and transmits the optical signal that has been combined and obtained; causing a receiver to receive said optical signal from said transmitter; and compressing pulses of at least one of polarization components of the optical signal and splitting the optical signal into two polarization components.

Effect of the Invention

According to the present invention, since a transmitter phase-modulates two optical signals (polarization components) by asymmetrical chirping and a receiver causes pulses of one polarization component to be compressed and splits the received signal into two polarization components, even if a wavelength dispersion takes place, the polarization component in which pulses are compressed can be extracted, resulting in suppression of the deterioration of the signal quality.

MODES FOR CARRYING OUT THE INVENTION

First Exemplary Embodiment

A first exemplary embodiment that embodies the present invention will be described in detail with reference to drawings.

Figure 1:
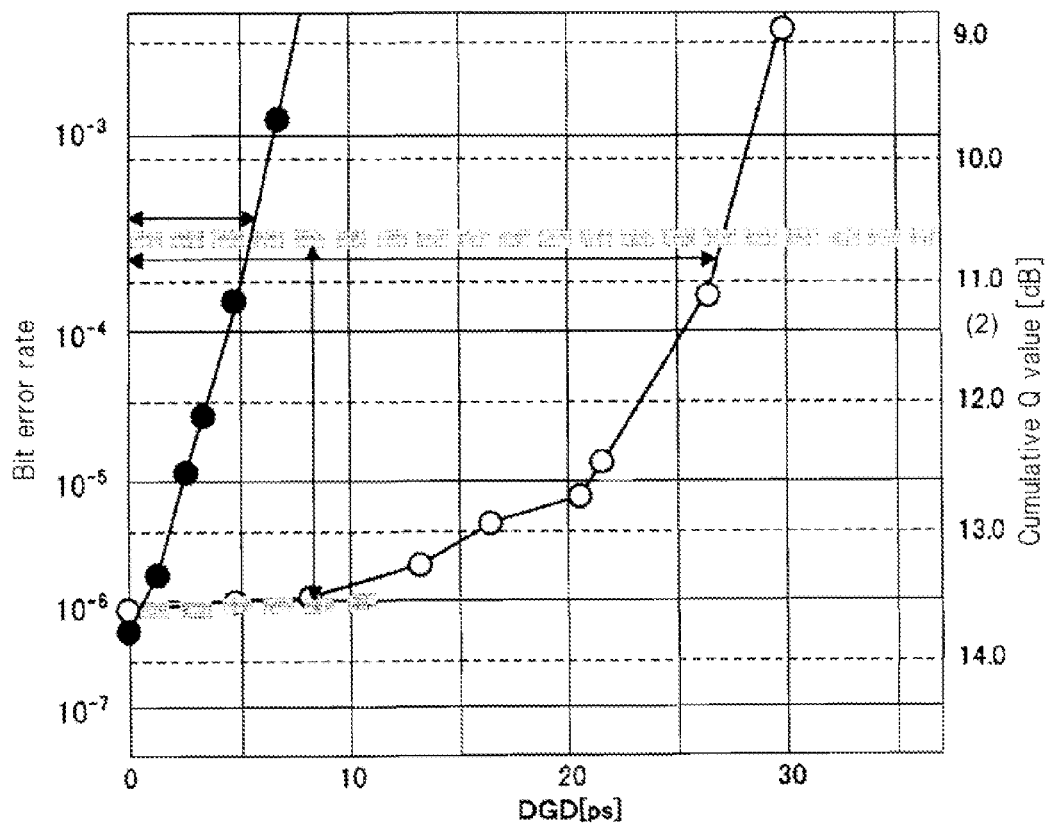
FIG. 1 is a schematic diagram showing the polarization dispersion resistance of a polarization multiplexed RZ-DQPSK signal.
Figure 2:
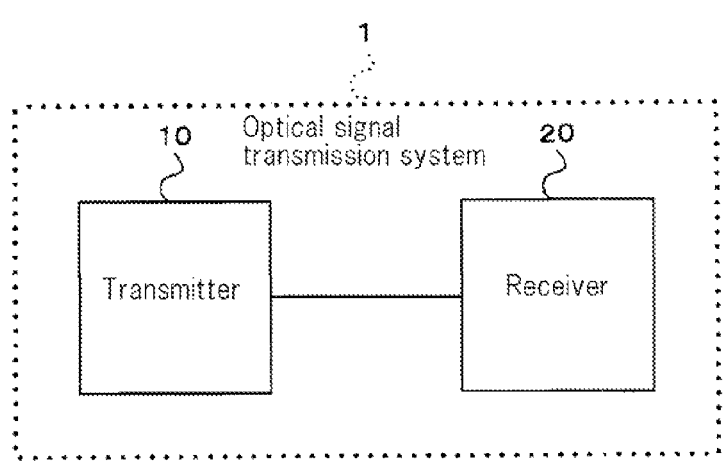
FIG. 2 is an overall schematic diagram showing the structure of an optical signal transmission system according to a first exemplary embodiment.

FIG. 2 is an overall schematic diagram showing the structure of optical signal transmission system 1 according to this exemplary embodiment. Optical signal transmission system 1 is a system that transmits optical signals according to the polarization multiplexing and splitting system. Referring to the drawing, optical signal transmission system 1 comprises transmitter 10 and receiver 20 and they are connected through a transmission line optical fiber.

Figure 3:
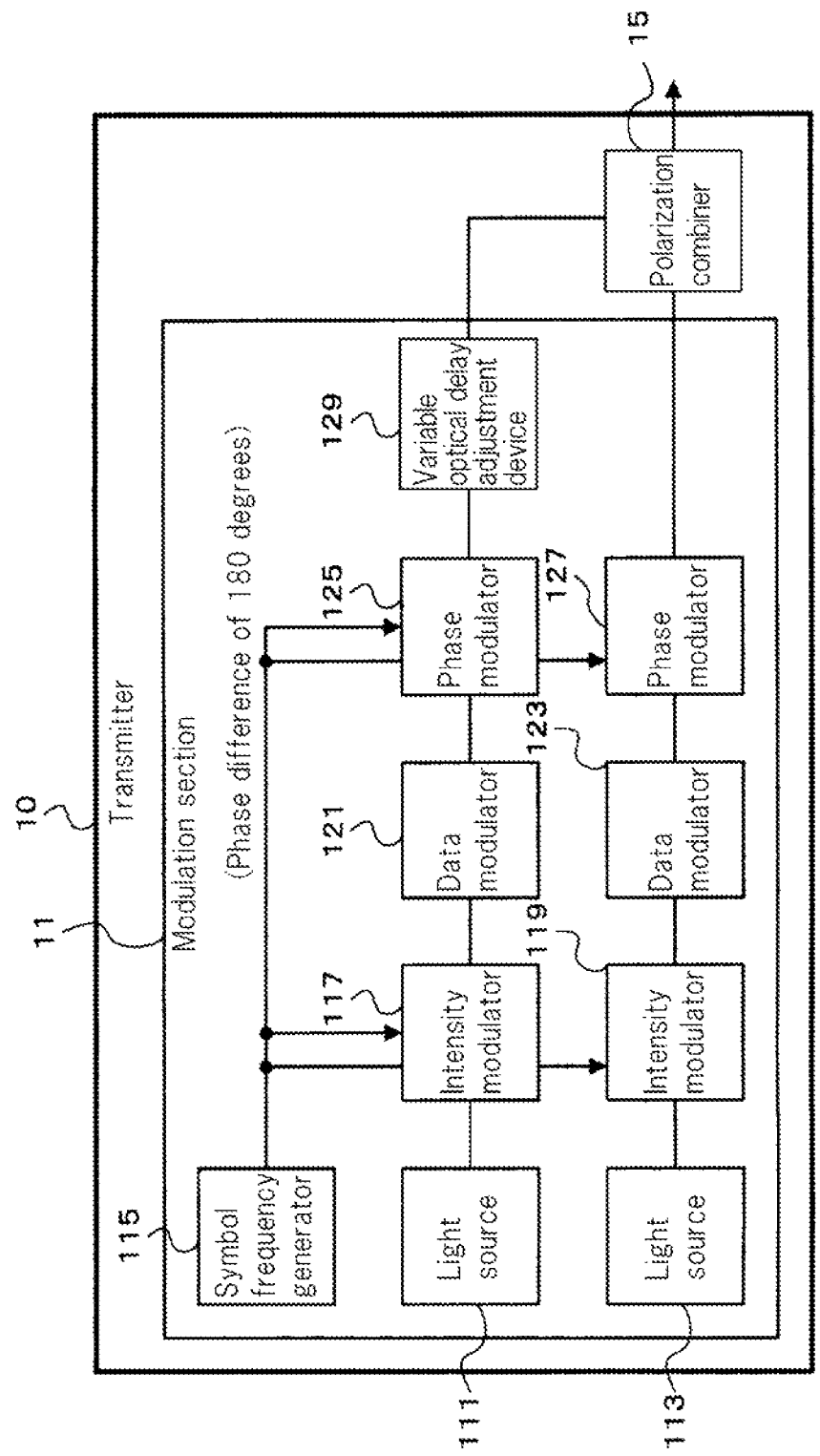
FIG. 3 is a block diagram showing the structure of a transmitter according to the first exemplary embodiment.

FIG. 3 is a block diagram showing the structure of transmitter 10. Referring to the drawing, transmitter 10 has modulation section 11 and polarization combiner 15.

Modulation section 11 has light sources 111 and 113, symbol frequency generator 115, intensity modulators 117 and 119, data modulators 121 and 123, phase modulators 125 and 127, and variable optical delay adjustment device 129.

Light source 111 generates a CW (Continuous Wave) light using a laser diode or the like and outputs the generated CW light to intensity modulator 117. Light source 113 outputs a CW light of the same wavelength as the CW light that light source 111 outputs to intensity modulator 119.

Symbol frequency generator 115 generates a clock signal (drive signal) of a predetermined symbol frequency and outputs the generated clock signal to intensity modulators 117 and 119. In addition, symbol frequency generator 115 outputs two clock signals having phases that are different from each other by 180 degrees to phase modulators 125 and 127, respectively. The reason why symbol frequency generator 115 shifts the phases of the clock signals that it outputs to phase modulators 125 and 127 is to accomplish asynchronous chirping.

In this context, asynchronous chirping means that chirping is performed in reverse directions (asymmetrically) with the same chirping depth (signal intensity). In other words, asymmetrical chirping means that the first half and the second half of each symbol of one of two optical signals of the same frequency are up-chirped and down-chirped, respectively, whereas the first half and the last half of each symbol of the other optical signal are down-chirped and up-chirped, respectively.

Intensity modulator 117 RZ-formats the CW light that is output from light source 111 depending on the clock signal that is input from symbol frequency generator 115. Intensity modulator 117 outputs the RZ formatted signal (hereinafter referred to as "RZ signal") to data modulator 121. Intensity modulator 119 RZ-formats the CW light that is output from light source 113 and outputs the RZ signal to data modulator 123. Since intensity modulators 117 and 119 RZ-formats the CW light in synchronization with the same clock signal, the RZ signals that are output from these intensity modulators become synchronized signals.

Data modulator 121 data-modulates the RZ signal that is output from intensity modulator 117 according to, for example, the DQPSK (Differential Quadrature Phase Shift Keying) system and outputs the modulated signal (hereinafter referred to as the "RZ-DQPSK signal") to phase modulator 125. Data modulator 123 data-modulates the RZ signal that is output from intensity modulator 119 and outputs the modulated signal to phase modulator 127.

Phase modulator 125 phase-modules the RZ-DQPSK signal that is input from data modulator 121 corresponding to the clock signal that is input from symbol frequency generator 115 according to sine wave phase modulation at a symbol synchronous speed. For example, when a signal light is at 55 Gb/s (Giga bit/second), phase modulator 125 phase-modulates the signal light at 27.5 GHz. Then, phase modulator 125 outputs the phase modulated RZ-DQPSK signal to variable optical delay adjustment device 129. Phase modulator 127 phase-modulates the RZ-DQPSK signal that is output from data modulator 123 corresponding to the clock signal that is input and outputs the phase-modulated signal to polarization combiner 15.

The phase difference of the clock signals that are input to phase modulators 125 and 127 has been adjusted at 180 degrees. Thus, the relative relationship of the phase shift amounts to the variation amounts of the signal intensities of phase modulators 125 and 127 is reverse to each other.

As a result, when one of phase modulators 125 and 127 up-chirps and down-chirps the first half and the second half, respectively, of each symbol, the other of phase modulators 125 and 127 down-chirps and up-chirps the first half and the second half, respectively, of each symbol.

Variable optical delay adjustment device 129 adjusts the temporal relative positions of the RZ-DQPSK signals that are output from phase modulators 125 and 127 so that the signals are polarization-multiplexed. Specifically, variable optical delay adjustment device 129 shifts the variation of the intensity of the signal light of the RZ-DQPSK signal that is output from phase modulator 125 from that of the RZ-DQPSK signal that is output from phase modulator 127 by 50% of a symbol slot and outputs the resultant signals to polarization combiner 15.

Polarization multiplexing combiner 15 combines (polarization multiplexes) the RZ-DQPSK signal that is output from variable optical delay adjustment device 129 and the RZ-DQPSK signal that is output from phase modulator 127 as polarization components.

Transmitter 10 transmits the polarization multiplexed RZ-DQPSK signal to receiver 20 through the optical fiber.

Figure 4:
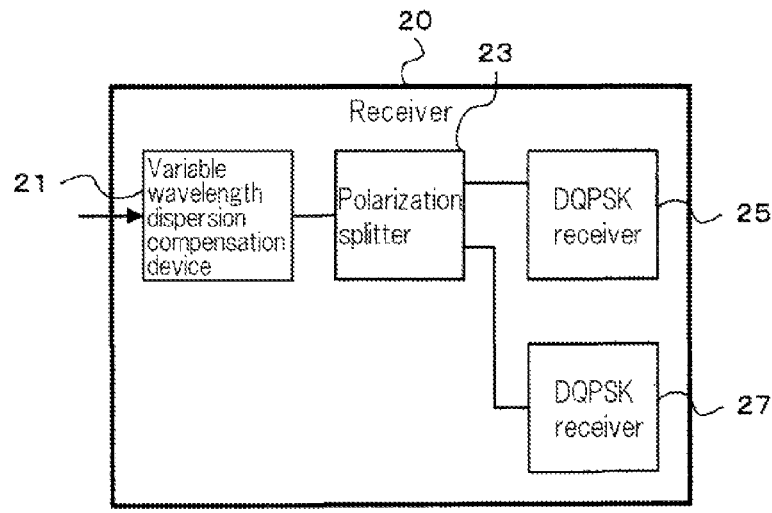
FIG. 4 is a block diagram showing the structure of a receiver according to the first exemplary embodiment.

FIG. 4 is a block diagram showing the structure of receiver 20. Referring to the drawing, receiver 20 has variable wavelength dispersion compensation device 21, polarization splitter 23, and DQPSK receivers 25 and 27.

Variable wavelength dispersion compensation device 21 compensates (adjusts) a wavelength dispersion of the RZ-DQPSK signal that is received from transmitter 10 such that a residual wavelength dispersion becomes 0 (ps/nm) and then outputs the resultant signal to polarization splitter 23.

Figure 5:
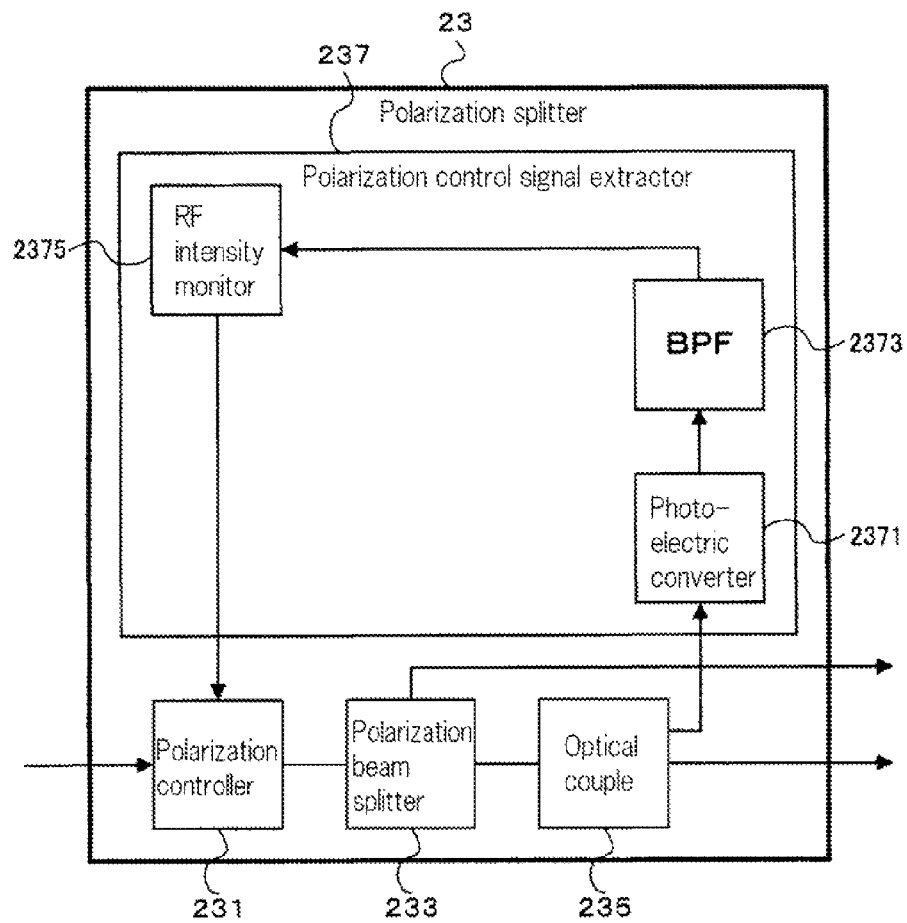
FIG. 5 is a block diagram showing the structure of a polarization splitter according to the first exemplary embodiment.

FIG. 5 is an overall schematic diagram showing the structure of polarization splitter 23 according to this exemplary embodiment. Polarization splitter 23 splits the RZ-DQPSK signal that is output from variable wavelength dispersion compensation device 21 into two polarization components. Referring to the drawing, polarization splitter 23 has polarization controller 231, polarization beam splitter 233, optical coupler 235, and polarization control signal extractor 237.

Polarization controller 231 outputs the signal light (RZ-DQPSK signal) that is output from variable wavelength dispersion compensation device 21 to polarization beam splitter 233.

Polarization beam splitter 233 splits the optical signal that is output from polarization controller 231 into two polarization components and outputs one of them to optical coupler 235 and the other to DQPSK receiver (25 or 27).

Optical coupler 235 branches a part of the signal light that is output from polarization beam splitter 233 to polarization control signal extractor 237 and the rest to DQPSK receiver (25 or 27).

Polarization control signal extractor 237 has photo-electric converter 2371, band-pass filter 2373, and RF intensity monitor 2375.

Photo-electric converter 2371 converts the optical signal that is output from optical coupler 235 into an electric signal and outputs the resultant signal to band-pass filter 2373. Band-pass filter 2373 extracts a signal of a predetermined frequency band (clock frequency sine wave) from the electric signal and outputs the extracted signal to RF intensity monitor 2375. RF intensity monitor 2375 detects the intensity of the signal that is input from band-pass filter 2373 and outputs an electric signal corresponding to the detected intensity to polarization controller 231.

Polarization controller 231 controls the polarization state such that the intensity of the input signal detected by RF intensity monitor 2375 is maximized or minimized.

Returning to FIG. 4, DQPSK receivers 25 and 27 demodulate the RZ-DQPSK signals corresponding to the polarization components that are output from polarization splitter 23 according to the DQPSK system.

Figure 6:
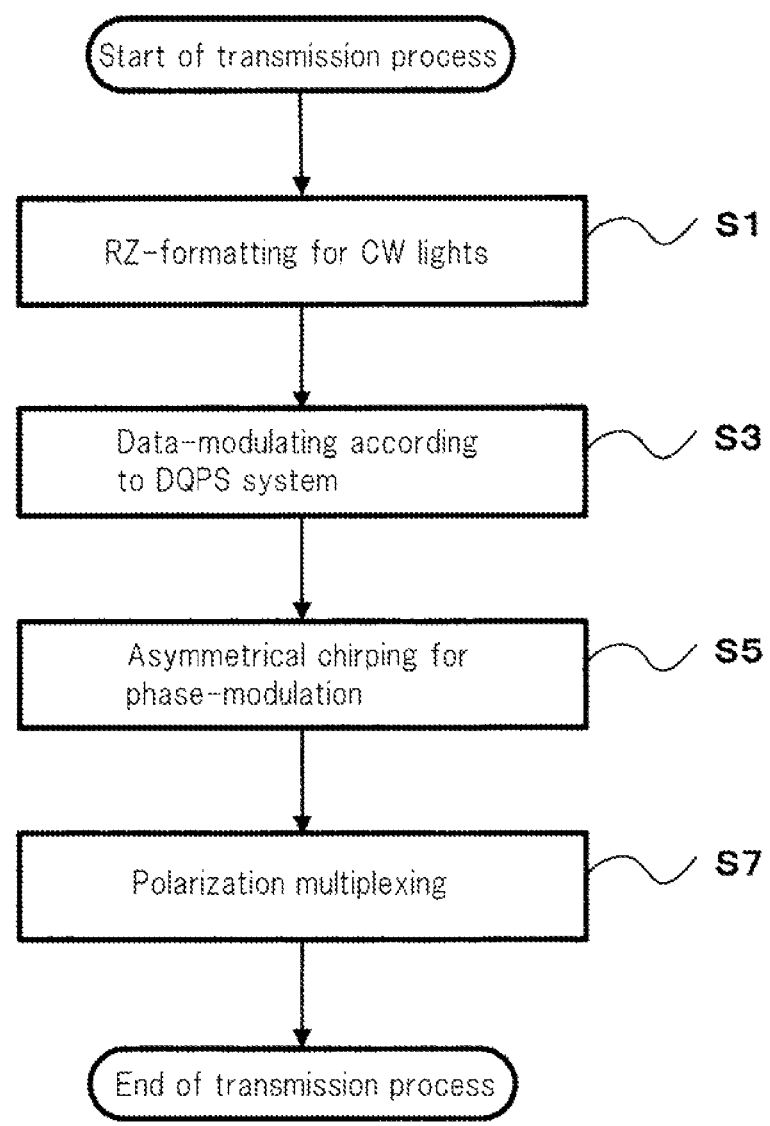
FIG. 6 is a flowchart showing the operation of the transmitter according to the first exemplary embodiment.

Next, with reference to FIGS. 6 and 7, the operation of optical signal transmission system 1 will be described. FIG. 6 is a flowchart showing the operation of transmitter 10. This operation starts when the power of transmitter 10 is turned on or when a predetermined application is executed. Referring to this drawing, intensity modulators 117 and 119 RZ-format CW lights that are output from light sources 111 and 113 corresponding to the same clock signal that is input (at step S1). Data modulators 121 and 123 data-modulates the RZ signals that are output from intensity modulators 117 and 119 (at step S3). Phase modulators 125 and 127 asymmetrically chirps the RZ-DQPSK signals that are output from data modulators 121 and 123 in synchronization with clock signals having phases that are different from each other by 180 degrees so as to phase-modulate the RZ-DQPSK signals (at step S5).

Polarization multiplexing section 15, polarization multiplexing combiner 15, combines the polarization components that are output from variable optical delay adjustment device 129 and phase modulator 127 (at step S7).

Figure 7:
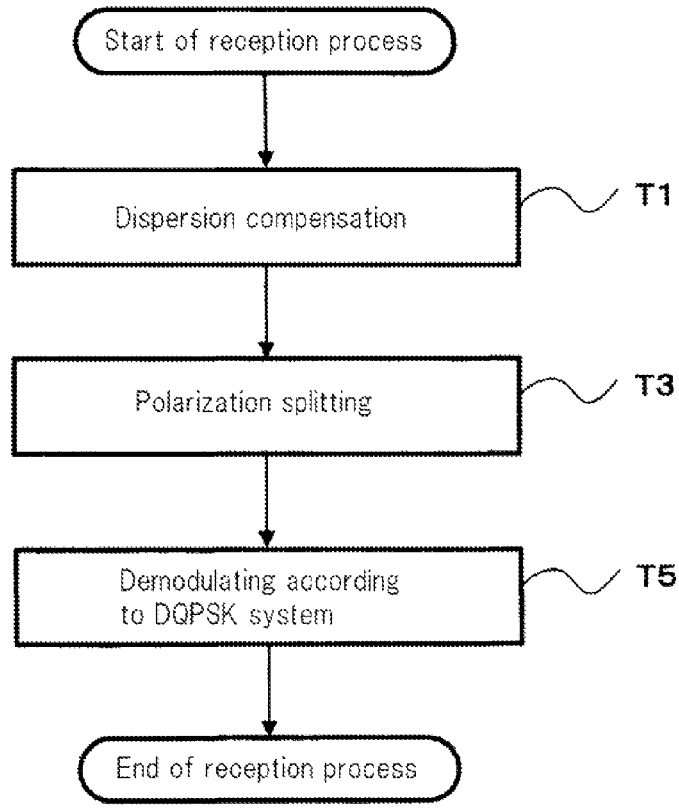
FIG. 7 is a flowchart showing the operation of the receiver according to the first exemplary embodiment.

FIG. 7 is a flowchart showing the operation of transmitter 10. This operation starts when the RZ-DQPSK signal is input from transmitter 10. Variable wavelength dispersion compensation device 21 compensates a wavelength dispersion in the RZ-DQPSK signal that is received from transmitter 10 such that the residual wavelength dispersion becomes 0 (ps/nm) (at step T1). Polarization splitter 23 splits the RZ-DQPSK signal that is output from variable wavelength dispersion compensation device 21 into two polarization components (at step T3). DQPSK receivers 25 and 27 demodulate RZ-DQPSK signals corresponding to the polarization components that are output from polarization splitter 23 according to the DQPSK system (at step T5).

Next, with reference to FIG. 8, the result of the operation of optical signal transmission system 1 will be described.

Figure 8:
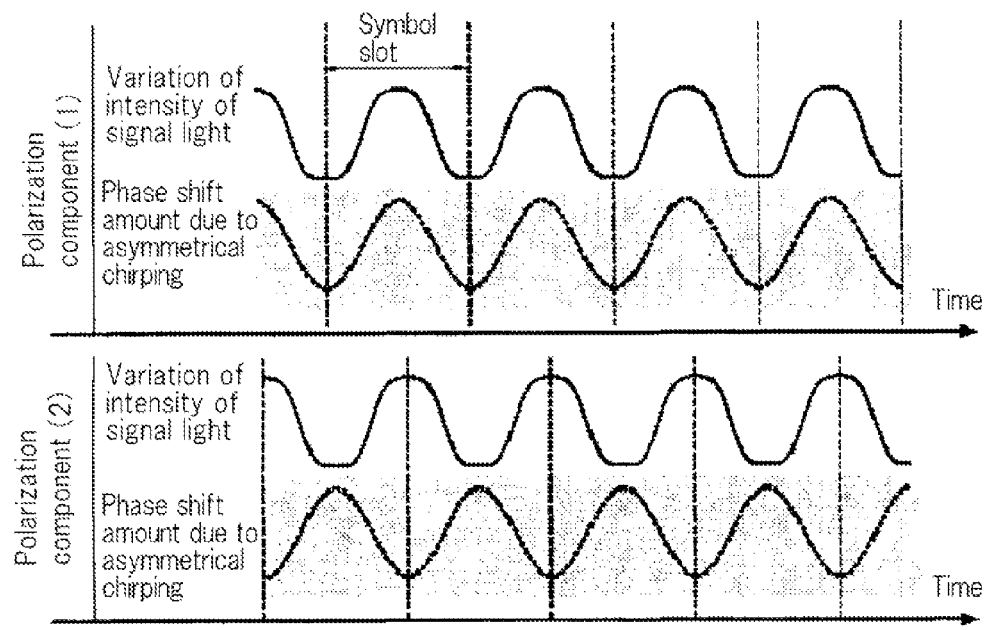
FIG. 8 is a schematic diagram showing changes of the signal intensity and phase shift of a signal that has been asymmetrically chirped according to the first exemplary embodiment.

FIG. 8 is a schematic diagram showing the state of phase shifts of polarization components that has been asymmetrically chirped. In this drawing, the vertical axis represents signal intensity or phase shift amount, whereas the horizontal axis represents time. Referring to the drawing, phase modulators 125 and 127 phase-modulate respective signals in synchronization with reversely phased clock signals so as reversely (asymmetrically) chirp the signals with the same chirping depth (signal intensity).

Next, with reference to FIG. 9 to FIG. 20, the effect of asymmetrical chirping will be described.

Figure 9:
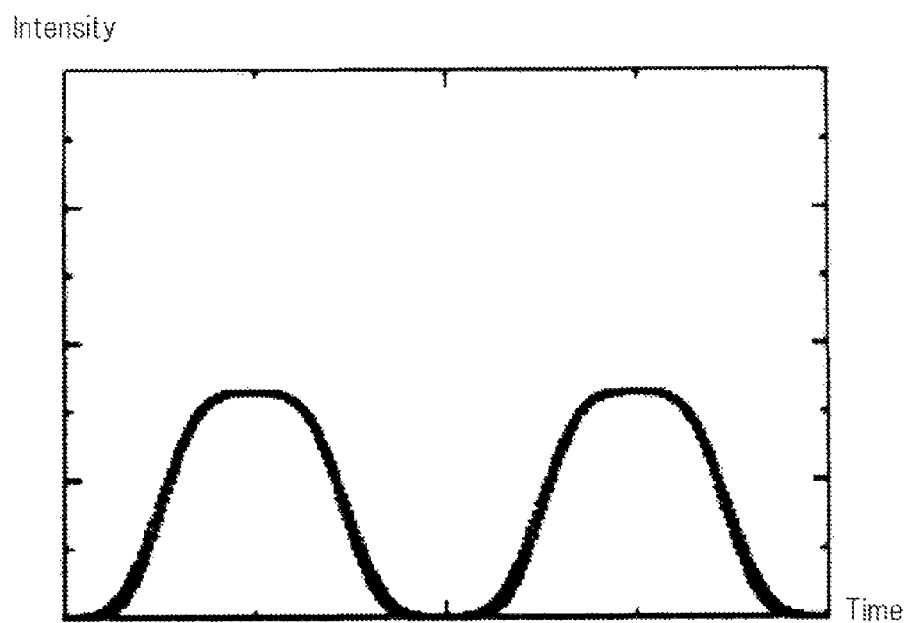
FIG. 9 is a schematic diagram showing the waveform of the RZ-DQSK signal according to the first exemplary embodiment.
Figure 10:
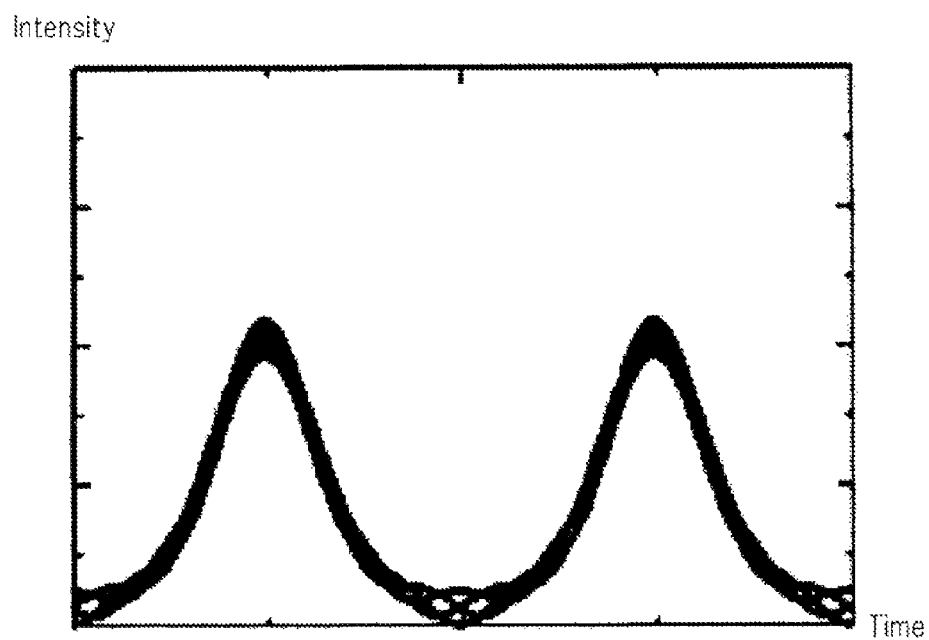
FIG. 10 is a schematic diagram showing the waveform of the RZ-DQSK signal according to the first exemplary embodiment.
Figure 11:
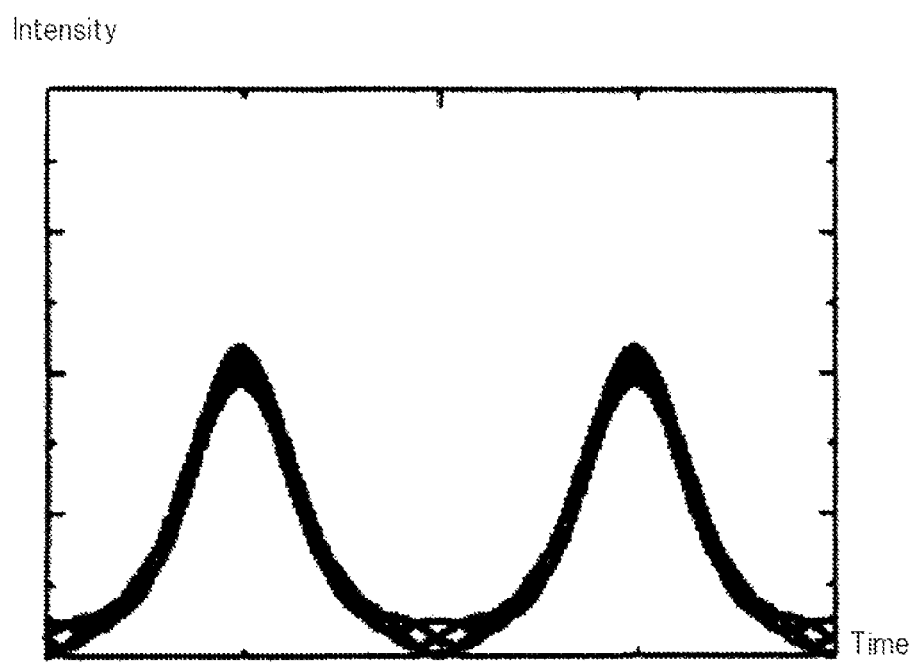
FIG. 11 is a schematic diagram showing the waveform of the RZ-DQSK signal according to the first exemplary embodiment.

FIG. 9 to FIG. 11 are schematic diagrams showing signal waveforms in the case that a waveform dispersion takes place in 55 Gb/s RZ-DQPSK signals before they are chirped. The wavelength dispersion values of signals in FIG. 9, FIG. 10, and FIG. 11 are ±0 (ps/nm), −25 (ps/nm), and +25 (ps/nm), respectively. In FIG. 9 to FIG. 11, the vertical axis represents intensity, whereas the horizontal axis represents time.

As shown in FIG. 9, when the wavelength dispersion value is 0 (ps/nm), a signal deterioration does not take place; however, as shown in FIG. 10 and FIG. 11, when the dispersion value is not 0 (ps/nm), a signal deterioration takes place depending on the size of the absolute value of the dispersion value.

Figure 12:
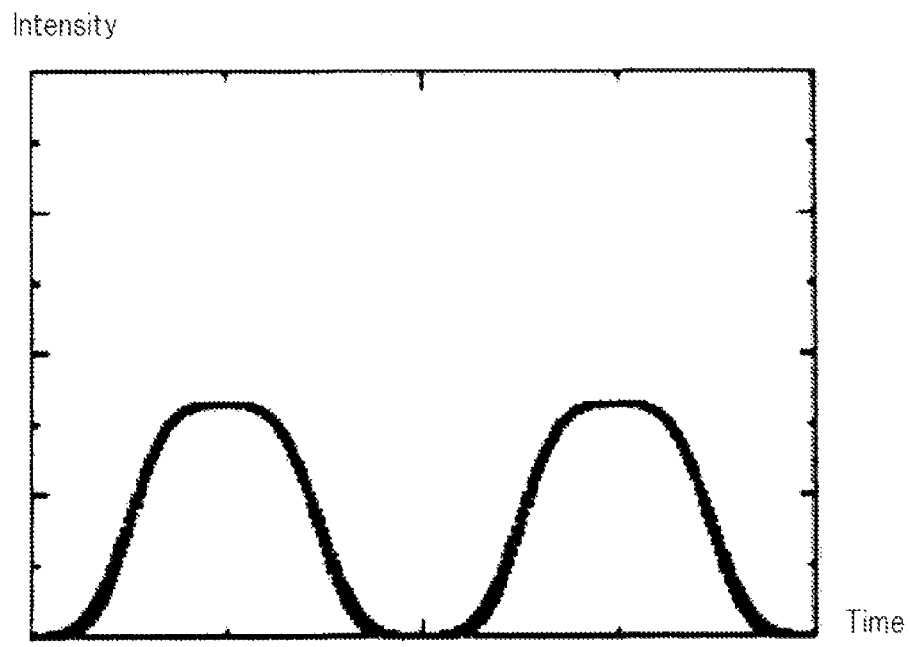
FIG. 12 is a schematic diagram showing the waveform of the RZ-DQSK signal that has been up-chirped according to the first exemplary embodiment.
Figure 13:
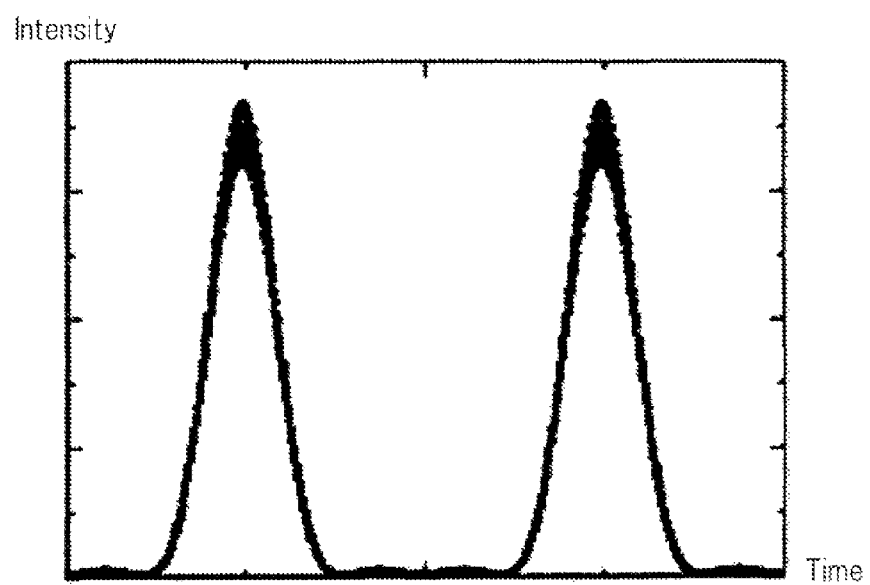
FIG. 13 is a schematic diagram showing the waveform of the RZ-DQSK signal that has been up-chirped according to the first exemplary embodiment.
Figure 14:
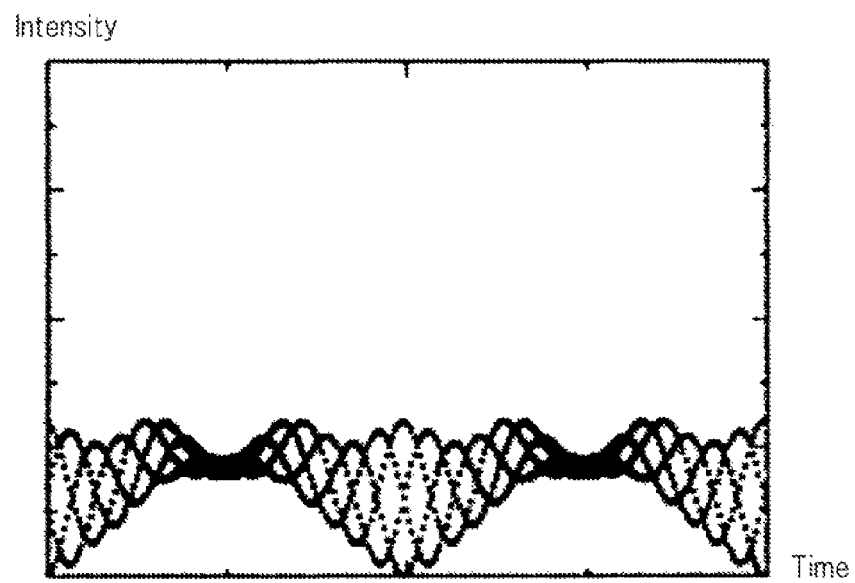
FIG. 14 is a schematic diagram showing the waveform of the RZ-DQSK signal that has been up-chirped according to the first exemplary embodiment.

FIG. 12 to FIG. 14 are schematic diagrams showing signal waveforms of 55 Gb/s RZ-DQPSK signals that have been symbol-synchronously chirped with a depth of 0.75 π (rad).

In this context, the chirping depth is the difference between the phase shift amount at which the signal intensity becomes the maximum and the phase shift amount at which the signal intensity becomes the minimum when the signal is chirped.

The wavelength dispersion values of signals in FIG. 12, FIG. 13, and FIG. 14 are ±0 (ps/nm), −25 (ps/nm), and +25 (ps/nm), respectively. In FIG. 12 and FIG. 13, the vertical axis represents intensity, whereas the horizontal axis represents time.

Figure 15:
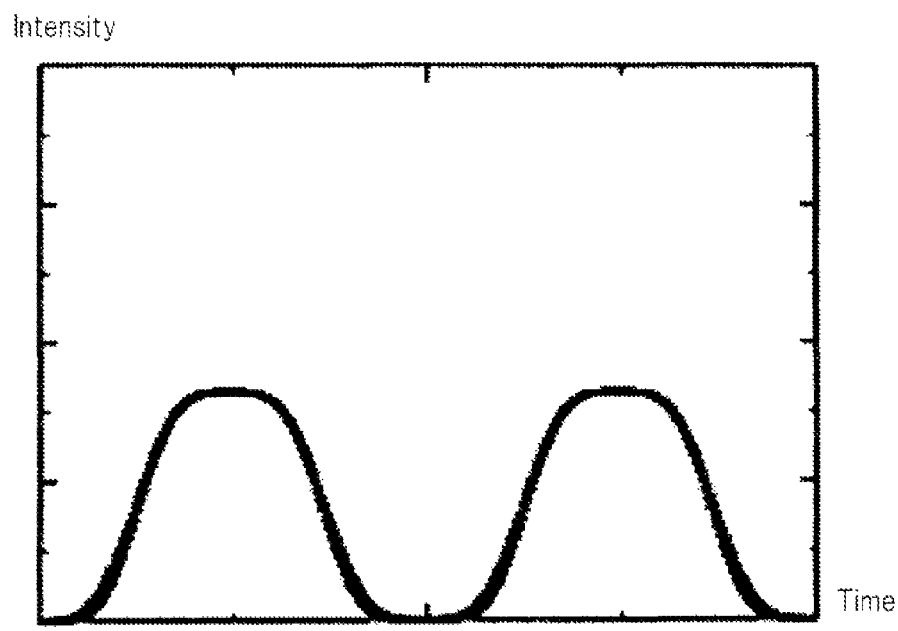
FIG. 15 is a schematic diagram showing the waveform of the RZ-DQSK signal that has been down-chirped according to the first exemplary embodiment.
Figure 16:
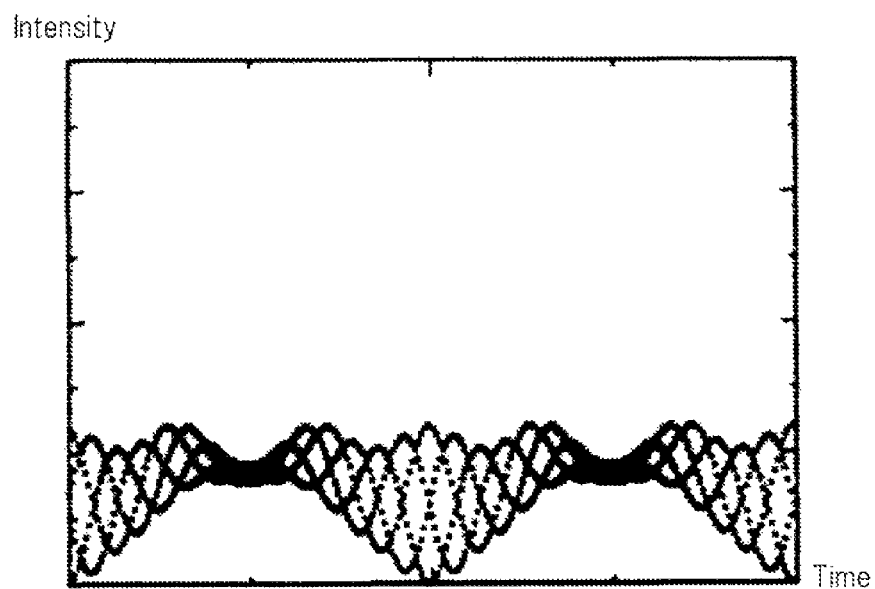
FIG. 16 is a schematic diagram showing the waveform of the RZ-DQSK signal that has been down-chirped according to the first exemplary embodiment.
Figure 17:
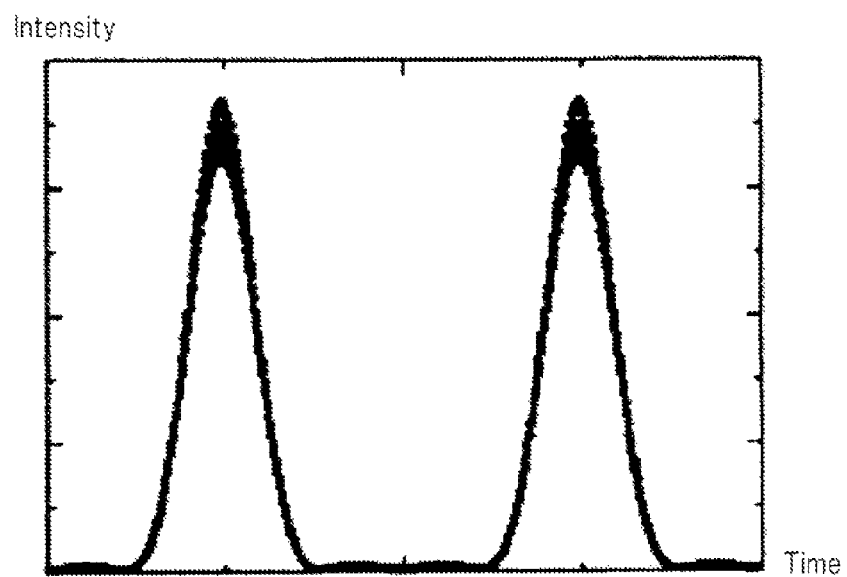
FIG. 17 is a schematic diagram showing the waveform of the RZ-DQSK signal that has been down-chirped according to the first exemplary embodiment.

In contrast, FIG. 15 to FIG. 17 are schematic diagrams showing signal waveforms of 55 Gb/s RZ-DQPSK signals that have been symbol-synchronously chirped with a phase that is reverse of that of the cases of FIG. 12 to FIG. 14 and with the same depth (0.75 π). The wavelength dispersion values of the signals in FIG. 15, FIG. 16, and FIG. 17 are ±0 (ps/nm), −25 (ps/nm), and +25 (ps/nm), respectively. In FIG. 15 to FIG. 17, the vertical axis represents intensity, whereas the horizontal axis represents time.

As shown in FIG. 12 and FIG. 15, when the dispersion value is 0 (ps/nm), no signal deterioration takes place. Referring to FIG. 13, FIG. 14, FIG. 16, and FIG. 17, however, pulses are compressed or expanded depending on whether the dispersion value is positive or negative. Thus, symbol synchronous frequency components contained in the envelope of the intensity of a signal light differ between two polarization components.

For example, when the dispersion value is a negative value, −25 (ps/nm), pulses are compressed in one polarization component as shown in FIG. 13, whereas pulses are expanded in the other polarization component as shown in FIG. 16. In contrast, when the dispersion value is a positive value, +25 (ps/nm), pulses are expanded in one polarization component as shown in FIG. 14, whereas pulses are compressed in the other polarization component as shown in FIG. 17.

In other words, when a wavelength dispersion takes place in polarization components that have been asymmetrically chirped, pulses are expanded in one polarization component, whereas pulses are compressed in the other polarization component.

Figure 18:
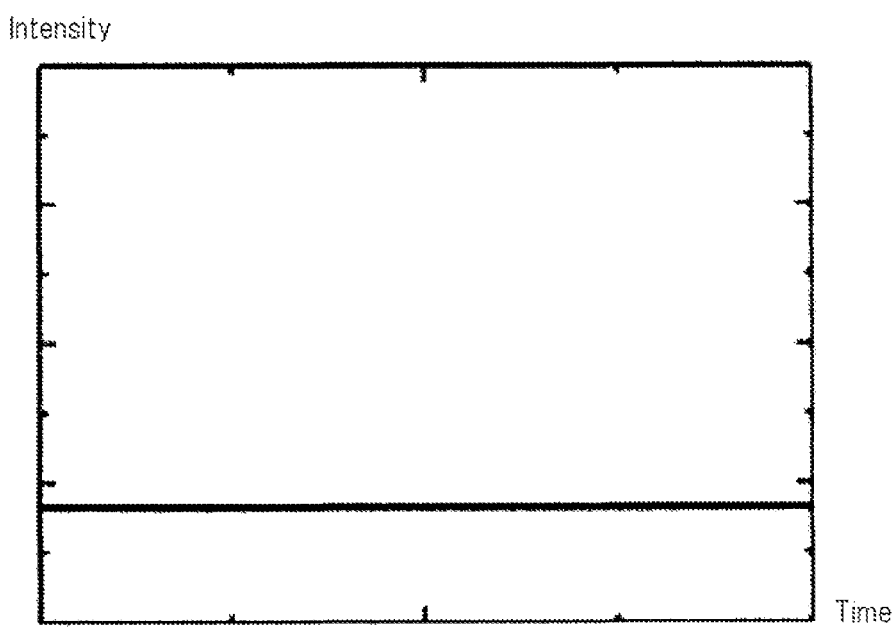
FIG. 18 is a schematic diagram showing the waveform of a polarization multiplexed RZ-DQSK signal according to the first exemplary embodiment.
Figure 19:
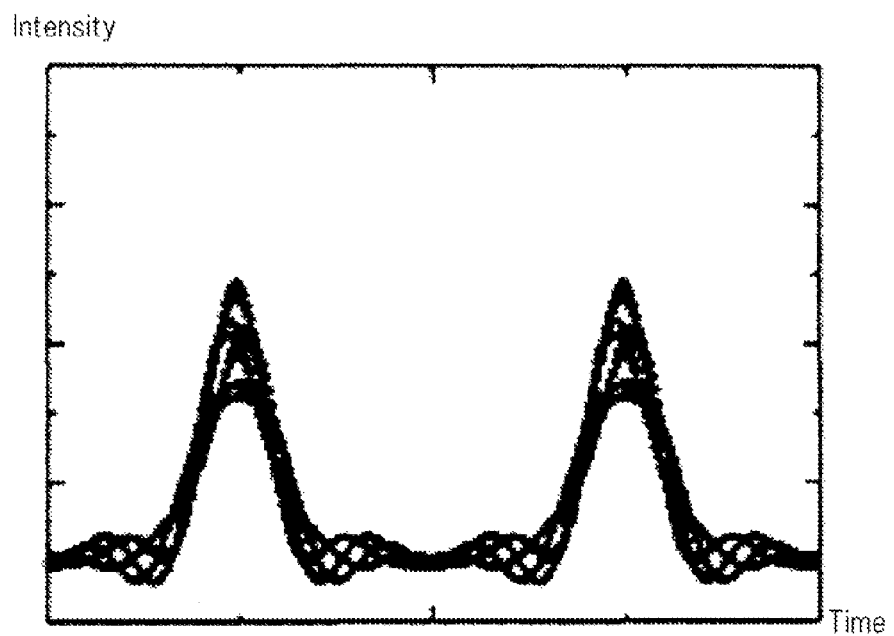
FIG. 19 is a schematic diagram showing the waveform of the polarization multiplexed RZ-DQSK signal according to the first exemplary embodiment.
Figure 20:
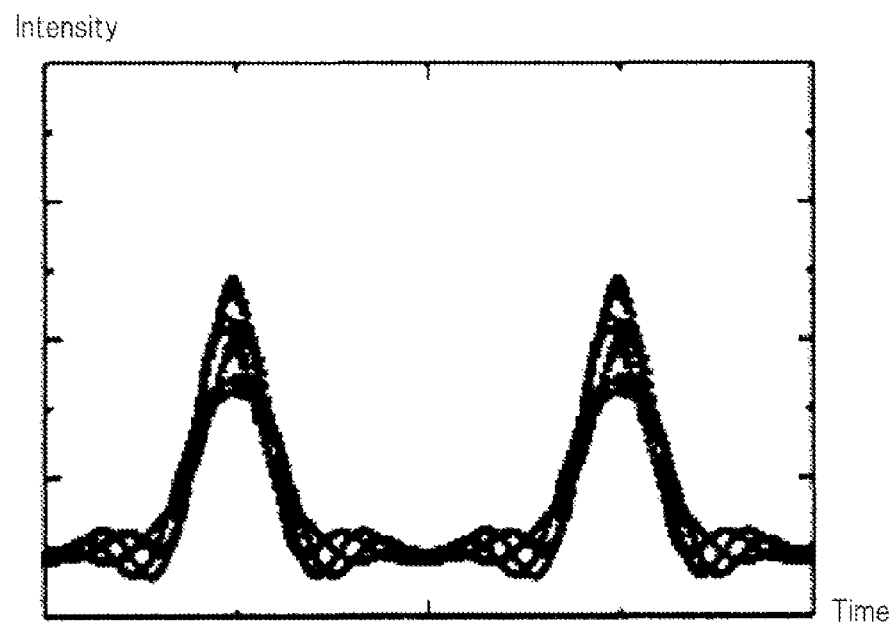
FIG. 20 is a schematic diagram showing the waveform of the polarization multiplexed RZ-DQSK signal according to the first exemplary embodiment.

FIG. 18 to FIG. 20 are schematic diagrams showing signal waveforms of a 110 Gb/s RZ-DQPSK signal in which polarization components that have been asymmetrically and symbol-synchronously chirped with a depth of 0.75 π (rad) have been multiplexed. The wavelength dispersion values in FIG. 18, FIG. 19, and FIG. 20 are ±0 (ps/nm), −25 (ps/nm), and +25 (ps/nm), respectively. In FIG. 18 to FIG. 20, the vertical axis represents intensity, whereas the horizontal axis represents time.

As shown in FIG. 18, when the wavelength dispersion value is 0 (ps/nm), since the phase difference of both polarization components is 180 degrees, the signal intensity of the combined polarization components becomes a constant value regardless of time. When the absolute values of the dispersion values are the same, as shown in FIG. 13, FIG. 14, FIG. 16, and FIG. 17, although both polarization components have different waveforms, when they are combined, the their waveforms become the same as shown in FIG. 19 and FIG. 20.

In one polarization component of the RZ-DQPSK signal that has been multiplexed, pulses are compressed (the clock frequency component is emphasized) as shown in FIG. 13 or FIG. 17; in the other polarization component, pulses are expanded (the clock frequency component is suppressed) as shown in FIG. 14 or FIG. 16. Thus, even if a signal light distorts due to the presence of a polarization dispersion, receiver 20 can stably extract one component. As a result, optical signal transmission system 1 can improve the resistance against a polarization dispersion.

Figure 21:
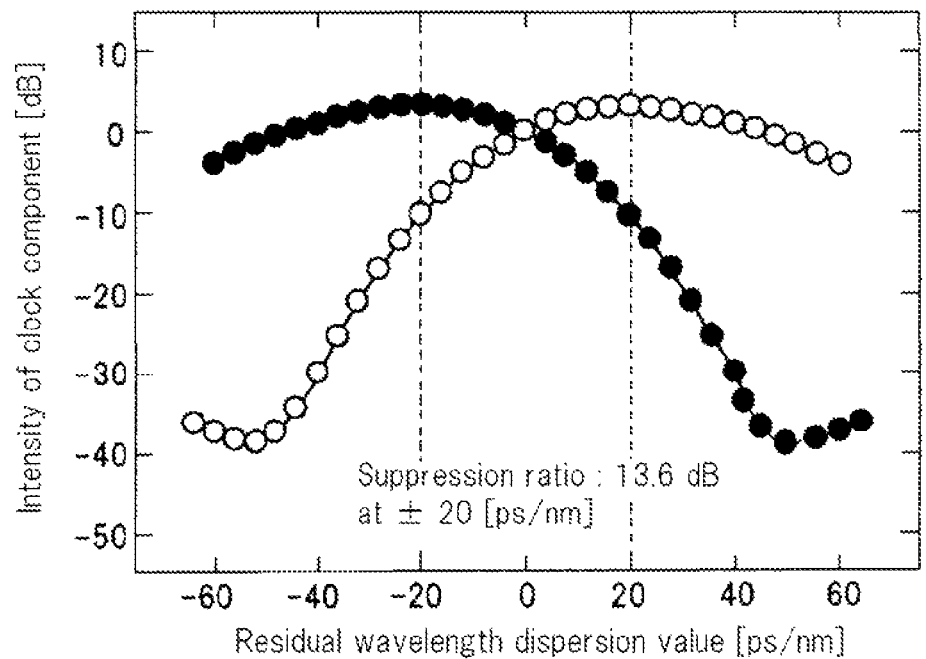
FIG. 21 is a schematic diagram showing the characteristics of dependency of residual wavelength dispersion value for the RZ-DQSK signal that has been asymmetrically chirped according to the first exemplary embodiment.
Figure 22:
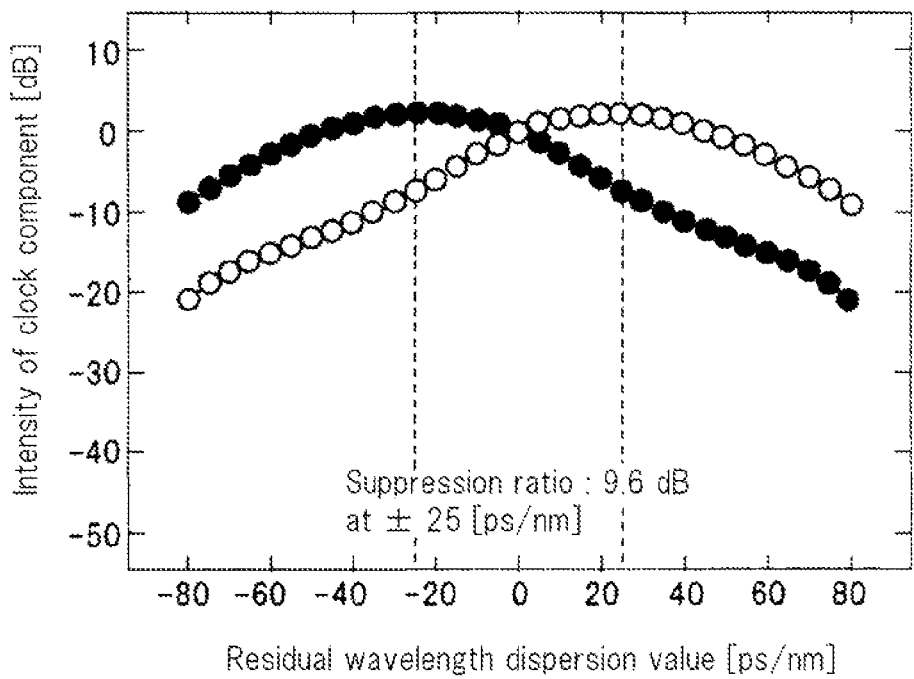
FIG. 22 is a schematic diagram showing the characteristics of dependency of residual wavelength dispersion value for the RZ-DQSK signal that has been asymmetrically chirped according to the first exemplary embodiment.
Figure 23:
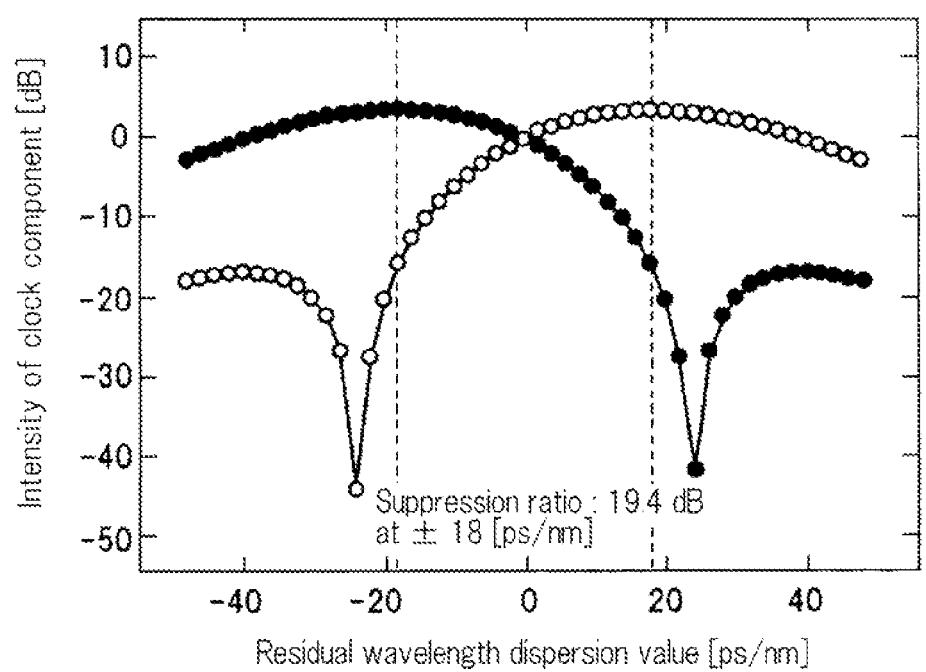
FIG. 23 is a schematic diagram showing the characteristics of dependency of residual wavelength dispersion value for the RZ-DQSK signal that has been asymmetrically chirped according to the first exemplary embodiment.

With reference to FIG. 21 to FIG. 23, the dependency characteristics of residual wavelength dispersion value on intensity of a clock component contained in the envelope of intensity of a signal light for a polarization multiplexed RZ-DQPSK signal that has been asymmetrically chirped will be described.

FIG. 21 is a schematic diagram showing a measurement result of the intensity of a clock component in each polarization component by varying the residual waveform dispersion value for a 110 Gb/s (2×55 Gb/s) polarization multiplexed RZ-DQPSK signal that has been asymmetrically and symbol-synchronously chirped having a depth of 0.75 π (rad). In this drawing, the vertical axis represents the intensity of the clock component (dB), whereas the horizontal axis represents the residual waveform dispersion value (ps/nm). White circles represent measurement values of a polarization component that has been up-chirped at the first half of each symbol, whereas black circles represent measurement values of a polarization component that has been down-chirped at the last half of each symbol.

Referring to FIG. 21, with a particular residual wavelength dispersion value, when pulses are compressed and the intensity of the clock component increases in one polarization component, pulses are expanded and the intensity of the clock component decreases in the other polarization component. As represented by the dotted line, pulses are most highly compressed and the intensity of the clock component is maximized when the residual wavelength dispersion value becomes ±20 (ps/nm). When a wavelength separation is caused to take place with this value, the ratio of clock intensities of the polarization components (hereinafter referred to as "suppression ratio") becomes 13.6 dB.

As the compression ratio becomes large, since the pulse of one polarization component is more compressed, the reception characteristic on the reception side becomes satisfactory.

FIG. 22 is a schematic diagram showing a measurement result of the intensity of the clock component of each polarization component for a polarization multiplexed RZ-DQPSK signal that has been asymmetrically and symbol-synchronously chirped with a depth of 0.50 π (rad). Referring to the drawing, when the residual wavelength dispersion value is ±25 (ps/nm), the suppression ratio becomes 9.6 dB.

FIG. 23 is a schematic diagram showing a measurement result of the intensity of the clock component of each polarization component for a polarization multiplexed RZ-DQPSK signal that has been asymmetrical and symbol-synchronously chirped with a depth of 1.0 π (rad). Referring to the drawing, when the residual wavelength dispersion value is ±18 (ps/nm), the suppression ratio becomes 19.4 dB.

As shown in FIG. 21 to FIG. 23, there is a clear tendency in which, as the chirping depth becomes larger, the suppression ratio between both polarization components becomes large, resulting in a decrease of the residual wavelength dispersion value that gives the suppression ratio.

In particular, referring to FIG. 22, when the chirping depth is 0.50 π (rad) or smaller, the suppression ratio becomes relatively small and thereby it is clear that there is no merit intentionally using many devices that asymmetrically chirp signal. On the other hand, when signal lights are deeply chirped, since their spectrum widths increase and are tend to be susceptible to wavelength multiplexing/demultiplexing filters, it is not always desirable to deeply chirp optical signals.

A setup method for the chirping depth and the residual wavelength dispersion value will be described. In this method, the maximum chirping amount is set up in the range in which the influence of the filtering effect is slight and then a residual wavelength dispersion value that causes pulses to be most highly compressed is selected. If a predetermined residual addition dispersion value is given because the spectrum width is restricted and thereby deep chirping is not applicable, a sufficient suppression ratio may not be obtained. However, in this case, when the absolute value of the residual wavelength dispersion value is increased to some extent, the suppression ratio may be improved.

In practice, the optimum chirping depth is estimated to be in the range from $0.50\pi$ to $1.0\pi$ (rad) from the measurement results shown in FIG. 21 to FIG. 23.

In this exemplary embodiment, although transmitter 10 and receiver 20 modulate and demodulate data according to the DQPSK system, as long as the intensity at the temporal center of each symbol of one polarization component and that of the other polarization component are the same, another modulation system may be used.

As described above, according to this exemplary embodiment, transmitter 10 phase-modulates two optical signals by asymmetrically chirping them (polarization components) and transmits the modulated signal, whereas receiver 20 compresses pulses of one polarization component and splits the modulated signal into two polarization components. Thus, since optical signal transmission system 1 can stably obtain a polarization component in which pulses have been compressed even if a polarization dispersion take place, optical signal transmission system 1 can prevent the signal quality from deteriorating.

In addition, since transmitter 10 phase-modulates RZ signals in synchronization with two clock signals having phases that are different from each other by 180 degrees, transmitter 10 can asymmetrical chirp the RZ signals.

By chirping with the same depth of $0.5\pi$ to $1.0\pi$, transmitter 10 can obtain the best suppression ratio, resulting in the improvement of reception quality.

Second Exemplary Embodiment

Figure 24:
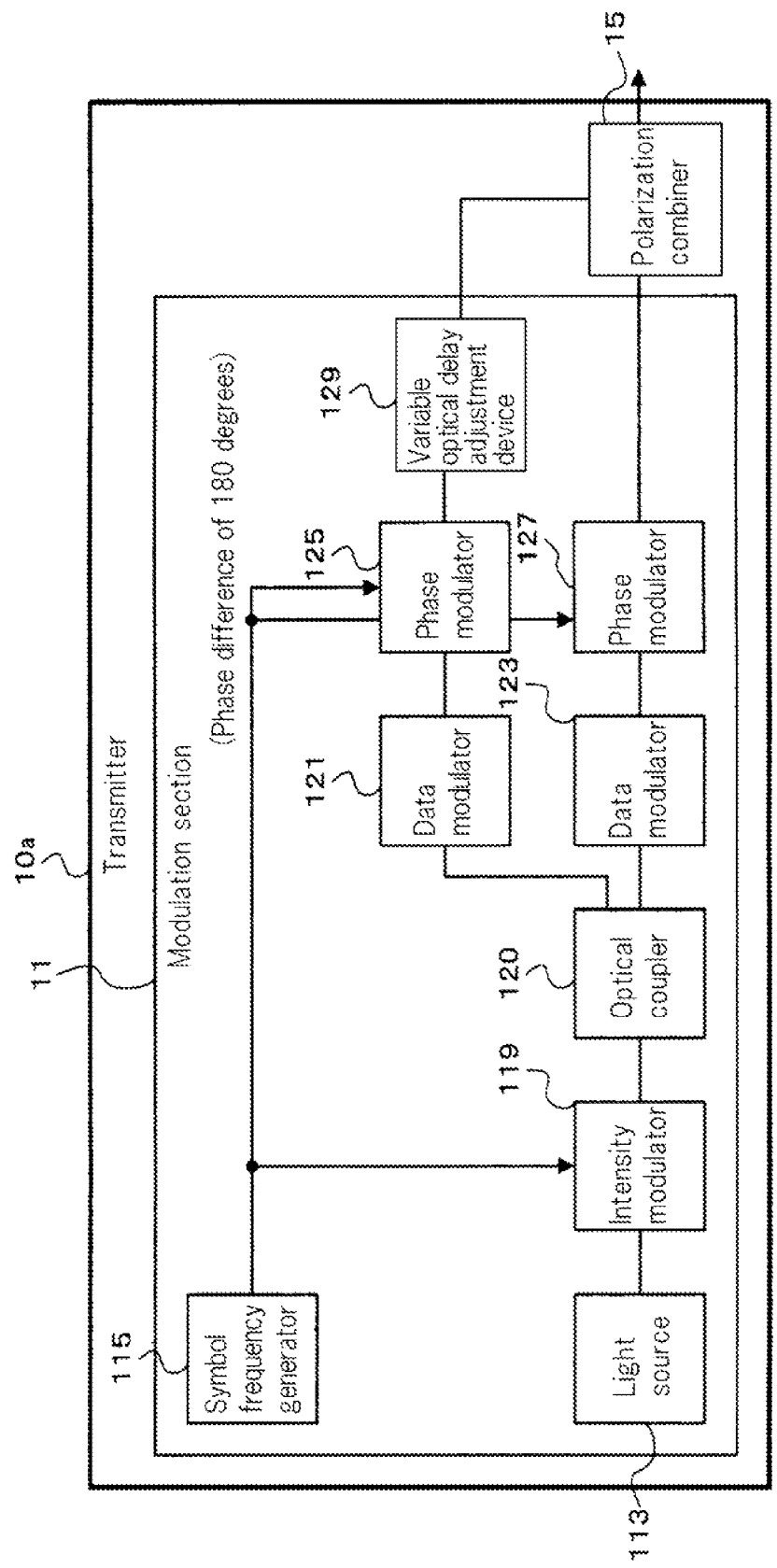
FIG. 24 is a block diagram showing the structure of a transmitter according to a second exemplary embodiment.

A second exemplary embodiment that accomplishes the present invention will be described with reference to FIG. 24. The drawing is an overall schematic diagram showing the structure of transmitter 10a according to this exemplary embodiment. Referring to the drawing, transmitter 10a has the same structure as that of transmitter 10 according to the first exemplary embodiment except that transmitter 10a is provided with one light source and one intensity modulator (113, 119) instead of two light sources (111 and 113) and two intensity modulators (117 and 119) and except that transmitter 10a is also provided with optical coupler 120 that branches an RZ signal.

Optical coupler 120 branches the RZ signal that is output from intensity modulator 119 and outputs the branched signals to data modulators 121 and 129.

As described above, according to this exemplary embodiment, two light sources and two intensity modulators can be aggregated into one light source and one intensity modulator in comparison with the first exemplary embodiment. Thus, since the number of parts of the optical signal transmission system can be decreased, while the reception quality is improved, the cost can be reduced.

Third Exemplary Embodiment

Figure 25:
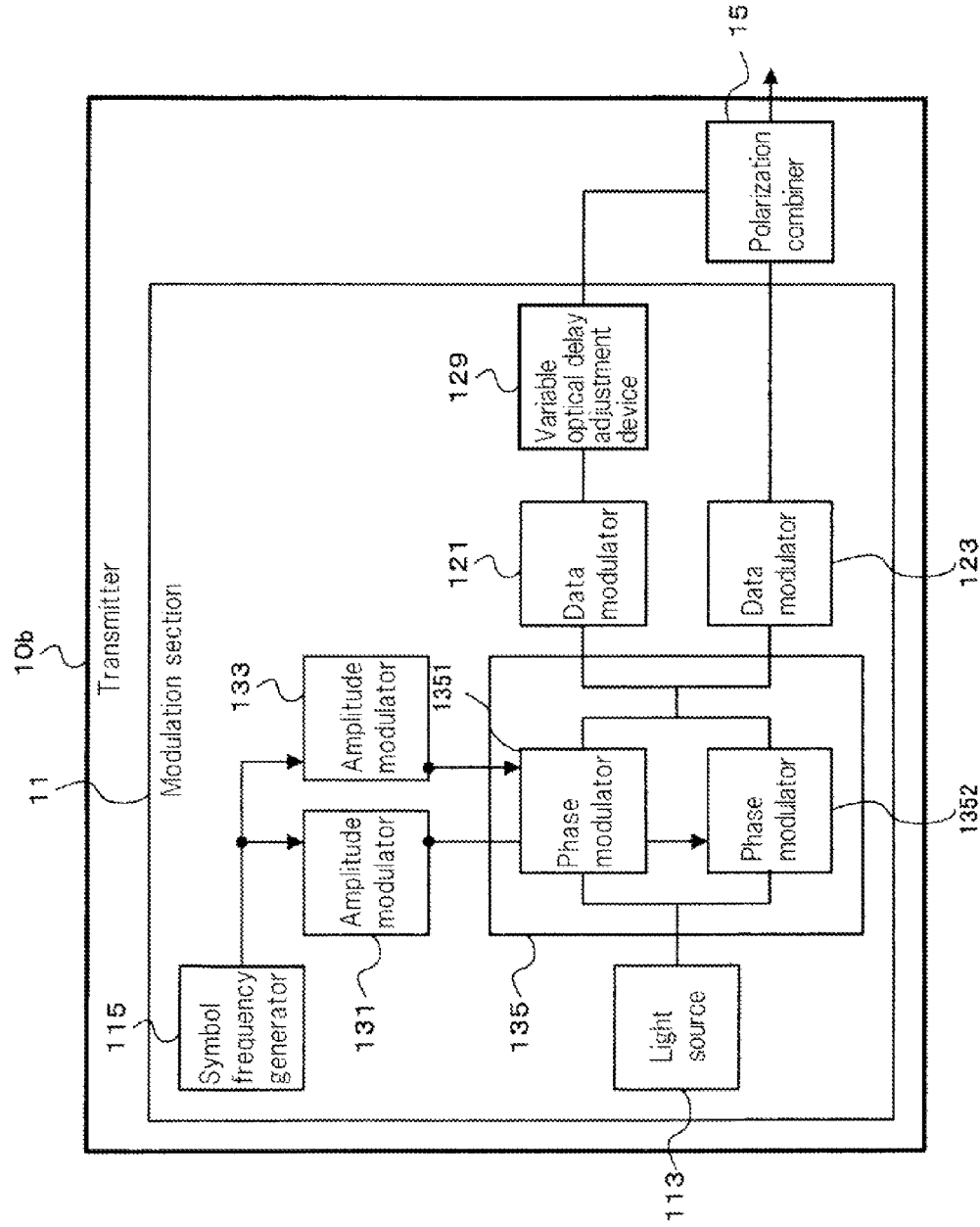
FIG. 25 is a block diagram showing the structure of a transmitter according to a third exemplary embodiment.

A third exemplary embodiment that accomplishes the present invention will be described with reference to FIG. 25 and FIG. 26. FIG. 25 is an overall schematic diagram showing the structure of transmitter 10b according to this exemplary embodiment. Referring to the drawing, transmitter 10b has the same structure as that of transmitter 10 according to the first exemplary embodiment except that transmitter 10b is provided with one light source (113) instead of two light sources (111 and 113) and except that transmitter 10b is provided with amplitude adjustment devices 131 and 133 and asymmetrically chirping RZ intensity modulator 135 instead of intensity modulators 117 and 119 and phase modulators 125 and 127. This exemplary embodiment is different from the first exemplary embodiment in a system that realizes asymmetrical chirping.

Light source 113 outputs a CW light to asymmetrically chirping RZ intensity modulator 135.

Amplitude adjustment devices 131 and 133 adjust the voltage amplitude of a clock signal that symbol frequency generator 115 generates such that the difference of the amplitudes of the clock signals that are output from the individual adjustment devices becomes $V\pi$ and output the resultant signals to asymmetrically chirping RZ intensity modulator 135. $V\pi$ is a voltage at which asymmetrically chirping RZ intensity modulator 135 needs to shift the phase of the input light by $\pi$ (rad).

On the other hand, the absolute amounts of the amplitudes are decided depending on the chirping depths. When asymmetrically chirped, if the phase shift amount is $\pi$ (rad), amplitude adjustment devices 131 and 133 will output signals having amplitudes of $1.5 \times V\pi$ and $0.5 \times V\pi$, respectively. If the phase shift amount is $0.75\pi$ (rad), amplitude adjustment devices 131 and 133 will output signals having amplitudes of $1.25 \times V\pi$ and $0.25 \times V\pi$, respectively. If the phase shift amount is $0.5\pi$ (rad), amplitude adjustment devices 131 and 133 will output signals having amplitudes of $\pi$ and 0, respectively.

If the phase shift amount is $0.5\pi$ (rad) or below, one of amplitude adjustment devices 131 and 133 needs to output a signal having an amplitude of a minus value. In this case, when amplitude adjustment device 131 or the like inverts the phase of one signal, an output of a signal having an amplitude of a minus value is realized.

Asymmetrically chirping RZ intensity modulator 135, an MZ (Mach Zehnder) interferometer in which independent phase modulation section 1351 and 1352 are disposed at both arms, combines optical signals that have been phase-modulated by 3-dB couplers or the like (not shown), and outputs the resultant signal to data modulators 121 and 123.

In addition, asymmetrically chirping RZ intensity modulator 135 performs a bias control as an interferometer such that outputs to data modulators 121 and 123 are RZ pulse sequences having the same light intensity.

Phase modulation sections 1351 and 1352 phase-modulate the RZ signal that is output from light source 113 by asymmetrically chirping the RZ signal in synchronization with clock signals having amplitudes adjusted by amplitude adjustment devices 131 and 133.

Figure 26:
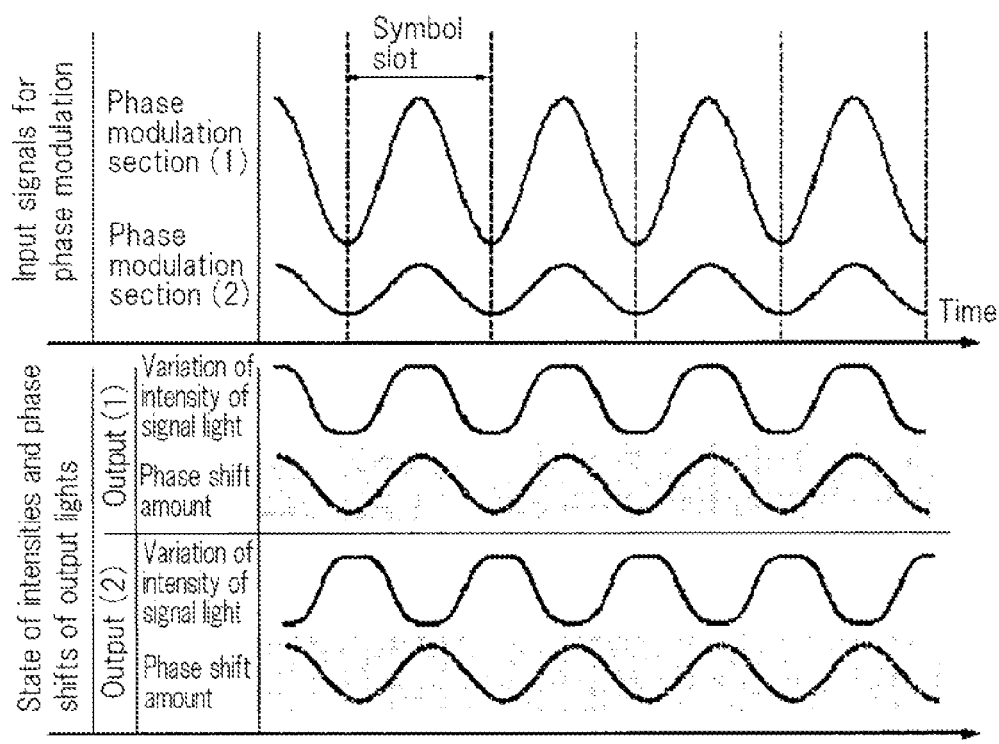
FIG. 26 is a schematic diagram showing the waveforms of input signals and output signals of the transmitter according to the third exemplary embodiment.

FIG. 26 is a schematic diagram showing the state of intensities and phase shifts of two input signals (clock signals) and two output signals in asymmetrically chirping RZ intensity modulator 135.

Referring to FIG. 26, the two input signals are symbol frequency sine waves having the same phase and different amplitudes. When the difference of the amplitudes satisfies a predetermined rule (the difference of amplitudes needs to be Vπ) and asymmetrically chirping RZ intensity modulator 135 performs the bias control, the two output signals become pulse sequences that have a pulse width of 50%, the same shape, and phases that are reverse to each other. In addition, since the phase shift of one output is the same as that of the other output, both the outputs become RZ pulse sequences that have been asymmetrically and symbol-synchronously chirped.

Although this exemplary embodiment is structured such that amplitude adjustment devices 131 and 133 adjust voltage amplitudes, it can be contemplated that the difference of amplitudes, Vz, may be generated by causing the lengths of electrodes between phase modulation sections 1351 and 1352 to be different instead of by using amplitude adjustment devices 131 and 133 disposed in transmitter 10b.

As described above, according to this exemplary embodiment, since transmitter 10b performs phase-modulating in synchronization with clock signals having voltage amplitudes that are different from each other by Vπ, transmitter 10b can perform asymmetrically chirping.

Fourth Exemplary Embodiment

Figure 27:
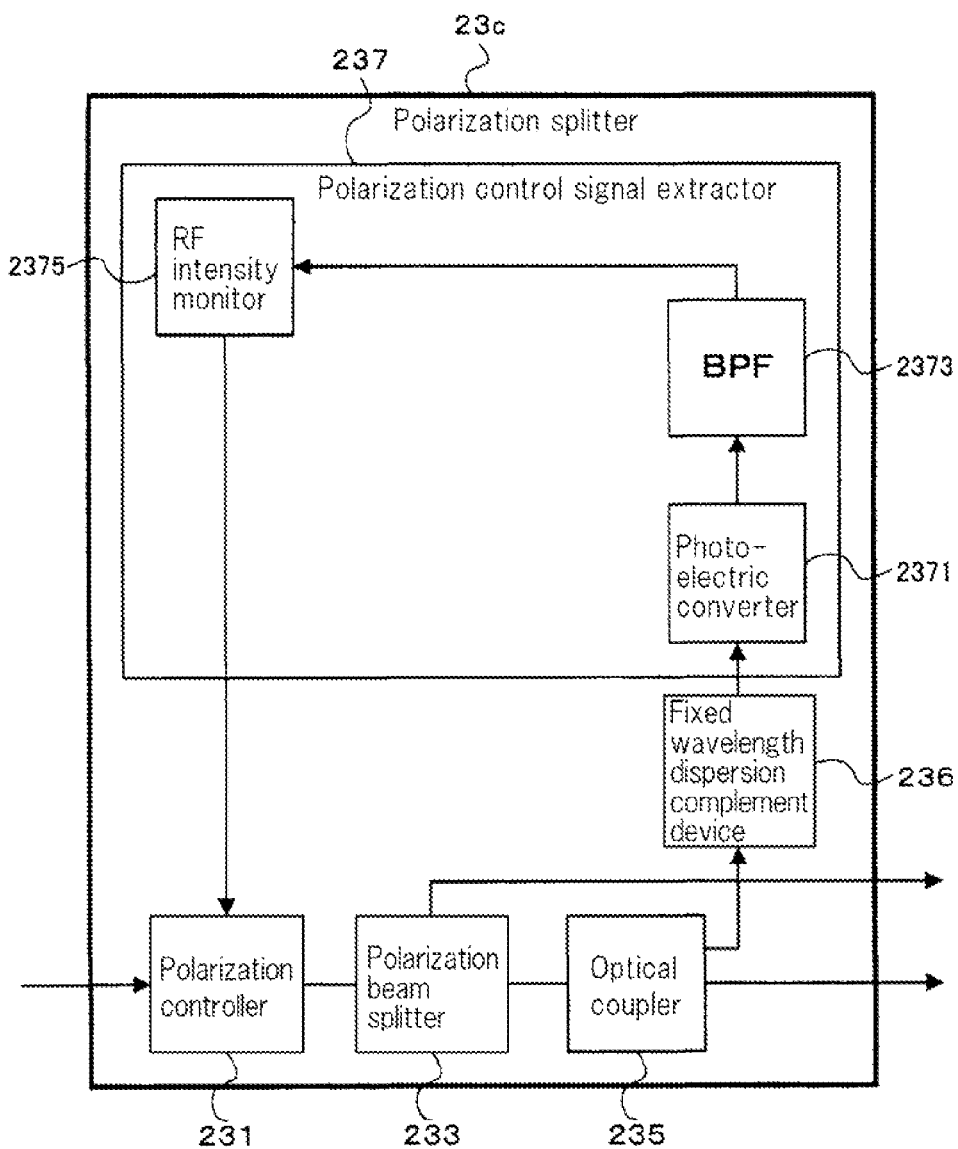
FIG. 27 is a block diagram showing the structure of a polarization splitter according to a fourth exemplary embodiment of the present invention.

A fourth exemplary embodiment that accomplishes the present invention will be described with reference to FIG. 27. This drawing is an overall schematic diagram showing the structure of polarization splitter 23c according to this exemplary embodiment. Referring to the drawing, polarization splitter 23c is different from polarization splitter 23 according to the first exemplary embodiment in that polarization splitter 23c is also provided with fixed wavelength dispersion complement device 236.

Optical coupler 235 branches a part of a signal light that is output from polarization beam splitter 233 and outputs the branched signal light to fixed wavelength dispersion complement device 236 and the rest to DQPSK receiver (25 or 27).

Fixed wavelength dispersion complement device 236, for example a dispersion compensation optical fiber, causes (adjusts) a wavelength dispersion for a predetermined wavelength dispersion value to take place in the signal light (polarization component) that is output from optical coupler 235 and outputs the resultant signal to polarization control signal extractor 237.

As described above, according to this exemplary embodiment, fixed wavelength dispersion complement device 236 compensates a wavelength dispersion that takes place in one of two polarization components. Thus, even if the residual wavelength dispersion value of a polarization component that is output from the variable wavelength dispersion compensation device is 0 and pulses have not been compressed in both polarization components, a state in which pulses are compressed in one of both polarization components takes place. Consequently, the quality of the reception signals is improved.

Fifth Exemplary Embodiment

Figure 28:
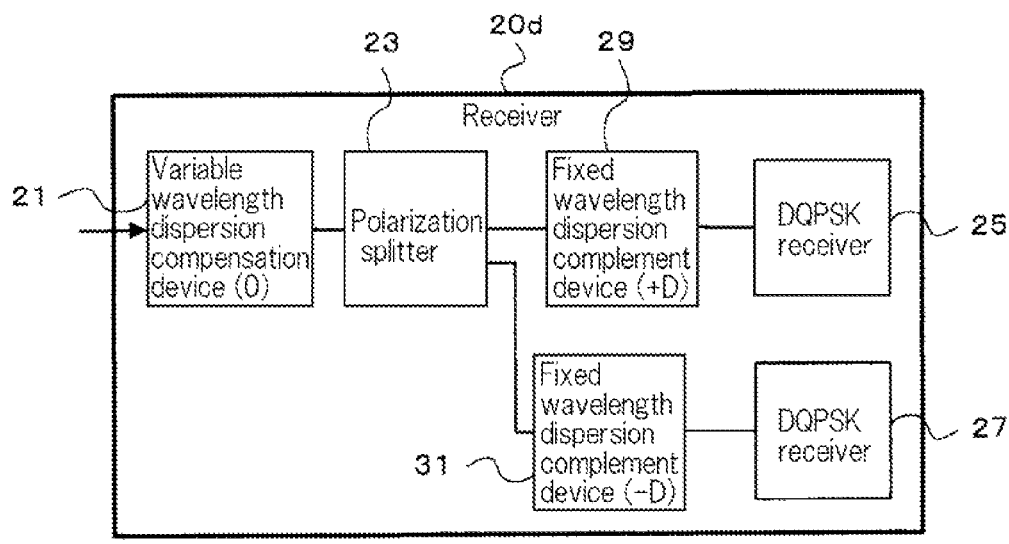
FIG. 28 is a block diagram showing the structure of a receiver according to a fifth exemplary embodiment.

A fifth exemplary embodiment that realizes the present invention will be described with reference to FIG. 28. This drawing is an overall schematic diagram showing the structure of receiver 20d according to this exemplary embodiment. Referring to the drawing, receiver 20d is different from receiver 20 in that receiver 20d is also provided with fixed wavelength dispersion complement devices 29 and 31.

Polarization splitter 23 outputs optical signals that have been split into polarization components to fixed wavelength dispersion complement devices 29 and 31.

Fixed wavelength dispersion complement devices 29 and 31 compensate wavelength dispersions having polarities that are reverse to each other that take place in polarization components that are output from polarization splitter 23. Fixed wavelength dispersion complement devices 29 and 31 output the compensated optical signals to DQPSK receivers 25 and 27, respectively.

A wavelength dispersion compensates for a polarization component in which pulses are compressed so as to reduce the difference of arrival times at receivers (25 and 27) of both polarization components that are delayed through dispersion compensation device 29.

For example, fixed wavelength dispersion complement device 29 compensates for a wavelength dispersion having a positive polarity, whereas fixed wavelength dispersion complement device 31 compensates for a wavelength dispersion having a negative polarity.

As described above, according to this exemplary embodiment, fixed wavelength dispersion complement devices 29 and 31 compensate for wavelength dispersions having polarities that are reverse to each other that take place in both polarization components, and the difference of arrival times at receivers (25 and 27) of polarization components delayed through dispersion compensation device (29 or 31) can be reduced, resulting in further improvement of the reception quality.

Sixth Exemplary Embodiment

Figure 29:
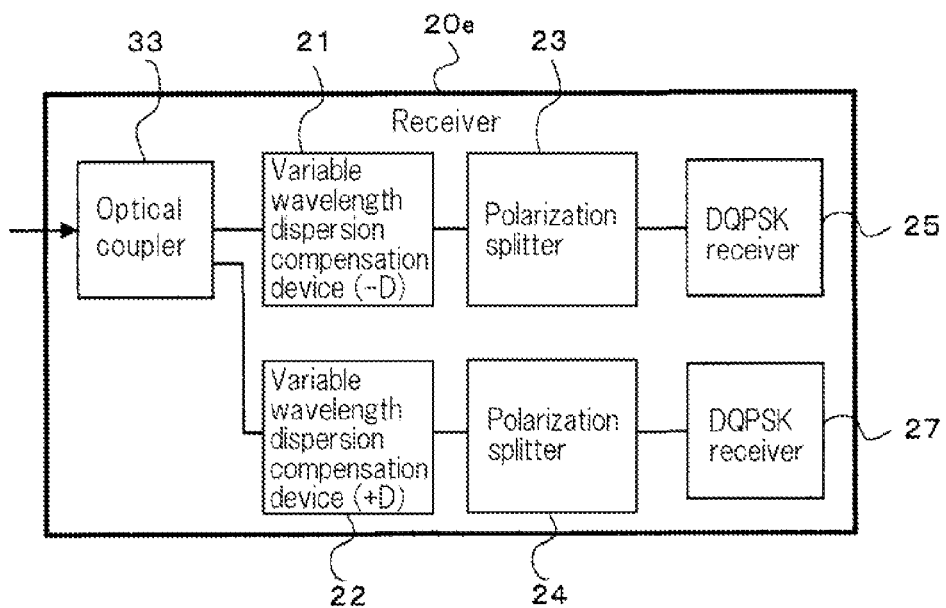
FIG. 29 is a block diagram showing the structure of a receiver according to a sixth exemplary embodiment.

A sixth exemplary embodiment that realizes the present invention will be described with reference to FIG. 29. This drawing is an overall schematic diagram showing the structure of receiver 20e according to this exemplary embodiment. Referring to the drawing, receiver 20e is different from receiver 20 according to the first exemplary embodiment in that receiver 20e is also provided with optical coupler 33 and two variable wavelength dispersion complement devices and two polarization splitters (21, 22, 23, and 24) instead of one variable wavelength dispersion complement device (21) and one polarization splitter (23).

Optical coupler 33 branches an optical signal (RZ-DQPSK signal) that is output from transmitter 10 into two signals and outputs them to variable wavelength dispersion complement devices 21 and 22.

Variable wavelength dispersion compensation devices 21 and 22 compensate for wavelength dispersions that take place in the optical signals that are output from optical coupler 33 such that the residual wavelength dispersion values become polarities that are reverse to each other and output the resultant signals to polarization splitters 23 and 24.

For example, variable wavelength dispersion compensation device 21 compensates for a wavelength dispersion such that the residual wavelength dispersion value becomes a negative value "−D", whereas variable wavelength dispersion compensation device 22 compensates for a wavelength dispersion such that the residual wavelength dispersion value becomes a positive value "+D".

Polarization splitters 23 and 24 split polarization components that are orthogonal to each other.

With each of the residual wavelength dispersion values "+D" and "−D," a polarization component in which pulses are compressed has a strong clock component in the envelop of the intensity of a signal light, whereas the intensity of the signal light of the other polarization component is suppressed. Thus, even if the orthogonality of both polarization dispersions is destroyed because a polarization dispersion takes place, a polarization component in which pulses are expanded has a smaller effects the extraction of a polarization control control signal, resulting in stably extracting a control signal.

As described above, according to this exemplary embodiment, since wavelength dispersions having polarities that are reverse to each other that take place in branched optical signals are compensated for and then polarization components are split, receiver 20 preferentially extracts a polarization component in which pulses are compressed and suppresses a polarization component in which pulses are expanded, resulting in stably splitting the control signal and improving the reception characteristics.

Seventh Exemplary Embodiment

Figure 30:
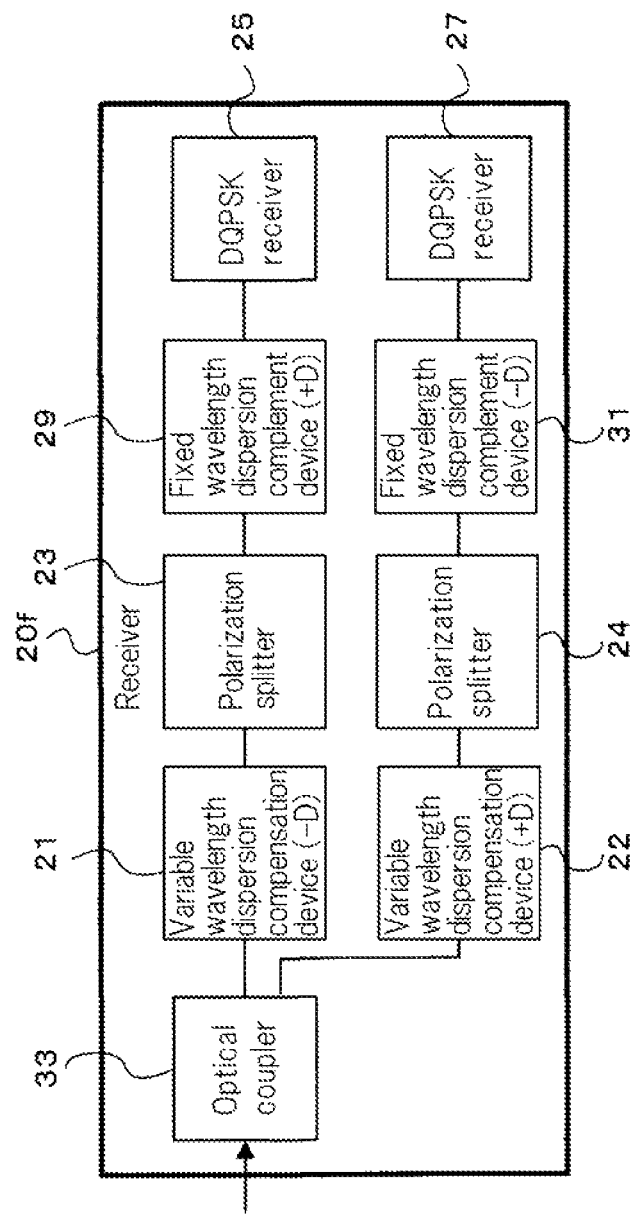
FIG. 30 is a block diagram showing the structure of a receiver according to a seventh exemplary embodiment.

A seventh exemplary embodiment that realizes the present invention will be described with referenced to FIG. 30. FIG. 30 is an overall schematic diagram showing the structure of receiver 20f according to this exemplary embodiment. Referring to the drawing, receiver 20f is different from receiver 20e according to the sixth exemplary embodiment in that receiver 20f is also provided with optical coupler 33, fixed wavelength dispersion complement devices 29 and 31 and in that the residual wavelength dispersion value is set to 0 before polarization components are split.

Variable wavelength splitters 21 and 22 compensate for wavelength dispersions such that the wavelength dispersion value becomes 0.

Polarization splitters 23 and 24 output both polarization components to fixed wavelength dispersion complement devices 29 and 31, respectively. Fixed wavelength dispersion complement devices 29 and 31 compensate for wavelength dispersions for predetermined wavelength dispersion values having polarities that are reverse to each other and output the resultant polarization components to DQPSK receivers 25 and 27.

For example, fixed wavelength dispersion complement device 29 complements a wavelength dispersion for a positive wavelength dispersion value "+D," whereas fixed wavelength dispersion complement device 31 complements a wavelength dispersion for a negative wavelength dispersion value "−D."

As described above, according to this exemplary embodiment, even if a wavelength dispersion that is incapable of being adjusted by a fixed wavelength dispersion complement device takes place, the wavelength dispersion can be compensated for by variable wavelength dispersion compensation devices 21 and 22.

Eighth Exemplary Embodiment

Figure 31:
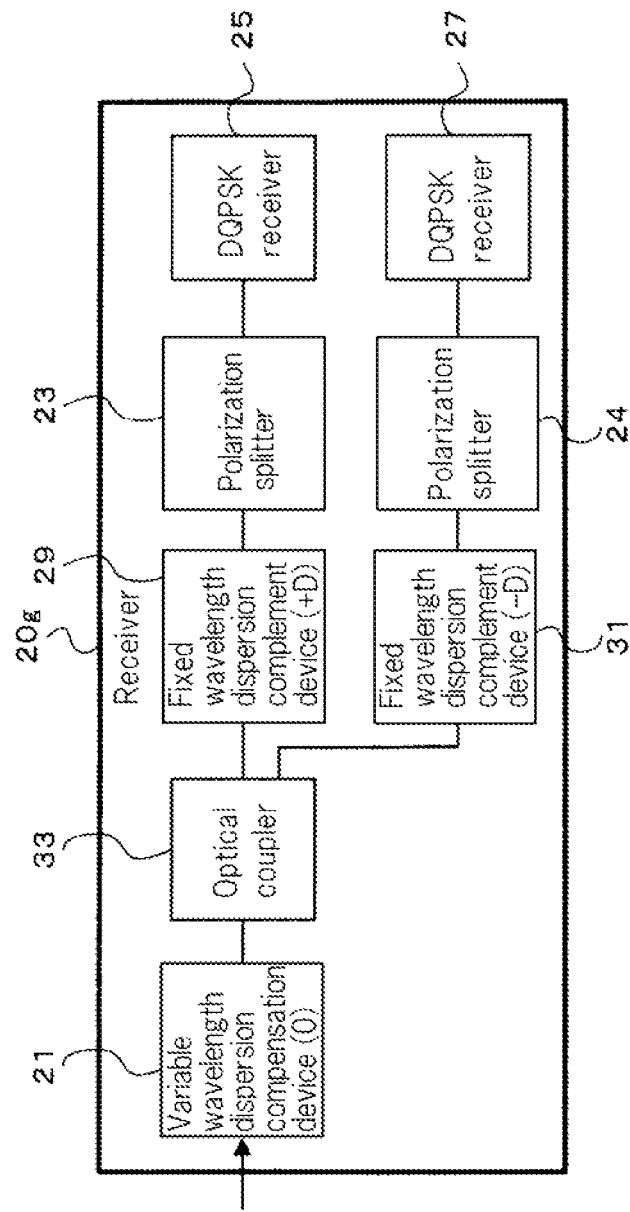
FIG. 31 is a block diagram showing the structure of a receiver according to an eighth exemplary embodiment.

An eighth exemplary embodiment that realizes the present invention will be described with reference to FIG. 31. FIG. 31 is an overall schematic diagram showing the structure of receiver 20g according to this exemplary embodiment. Referring to the drawing, receiver 20g is different from receiver 20f according to the seventh exemplary embodiment in that receiver 20g is provided with only one variable wavelength dispersion compensation device (21).

Variable wavelength dispersion compensation device 21 compensates for a wavelength dispersion that takes place in an optical signal that is received from transmitter 10 such that the residual wavelength dispersion value becomes 0 and outputs the resultant signal to optical coupler 33.

Optical coupler 33 branches an optical signal that is output from variable wavelength dispersion compensation device 21 into two optical signals and outputs them to fixed wavelength dispersion complement devices 23 and 24.

Fixed wavelength dispersion complement devices 29 and 31 compensate for wavelength dispersions for predetermined wavelength dispersion values having polarities that are reverse to each other and outputs the resultant optical signals to polarization splitters 23 and 24.

As described above, according to this exemplary embodiment, since optical signals pass through fixed wavelength dispersion complement devices (29 and 31) having polarities that are reverse to each other and thereby only one variable wavelength dispersion compensation device (21) needs to be used, while the reception characteristics are improved, the cost can be reduced.

Ninth Exemplary Embodiment

Figure 32:
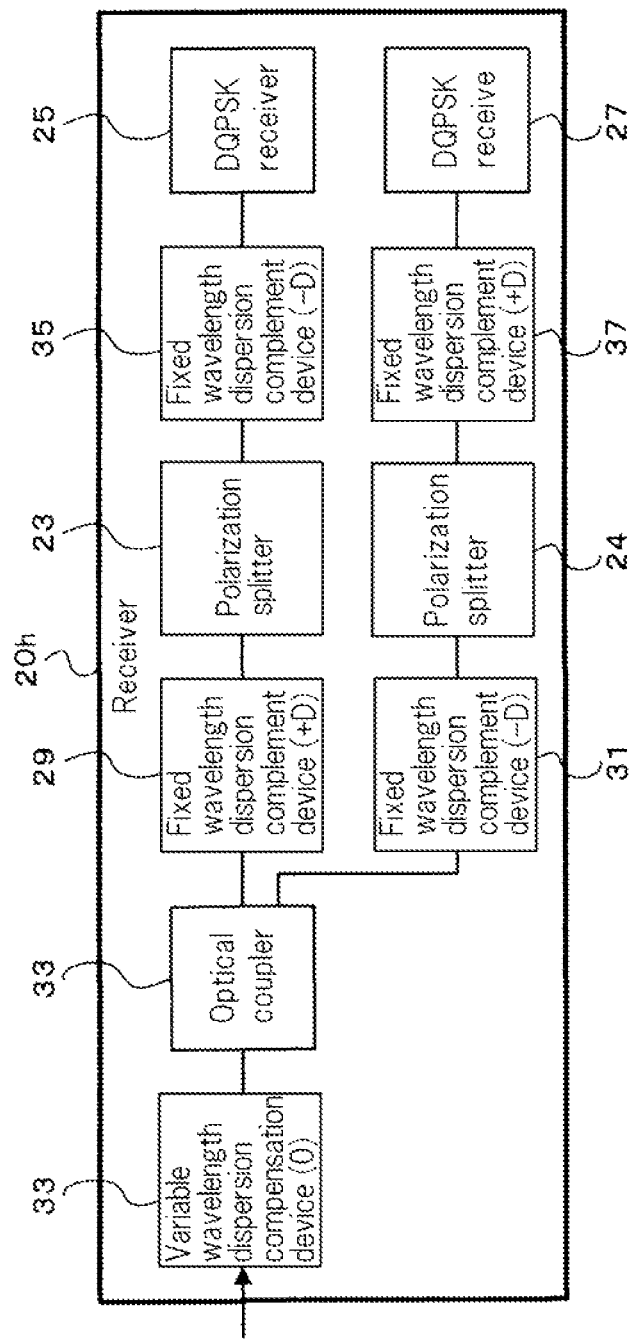
FIG. 32 is a block diagram showing the structure of a receiver according to a ninth exemplary embodiment.

A ninth exemplary embodiment that realizes the present invention will be described with reference to FIG. 32. FIG. 32 is an overall schematic diagram showing the structure of receiver 20h according to this exemplary embodiment. Referring to this drawing, receiver 20h is different from receiver 20g according to the eighth embodiment in that receiver 20h is also provided with fixed wavelength dispersion complement devices 35 and 37.

Polarization splitters 23 and 24 output polarization components to fixed wavelength dispersion complement devices 35 and 37.

Fixed wavelength dispersion complement devices 35 and 37 cause wavelength dispersions to take place such that their polarities are reverse to those of wavelength dispersions that fixed wavelength dispersion complement devices 29 and 31 cause to take place.

For example, when fixed wavelength dispersion complement device 29 causes a wavelength dispersion for a positive wavelength dispersion value to take place, fixed wavelength dispersion complement device 35 causes a wavelength dispersion for a negative wavelength dispersion value to take place. In contrast, when fixed wavelength dispersion complement device 31 causes a wavelength dispersion for a negative wavelength dispersion value to take place, fixed wavelength dispersion complement device 37 causes a wavelength dispersion for a positive wavelength dispersion value to take place.

As described above, according to this exemplary embodiment, since the residual wavelength dispersion values of optical signals that are input to DQPSK receivers 25 and 27 decrease, the reception characteristics are further improved.

Tenth Exemplary Embodiment

Figure 33:
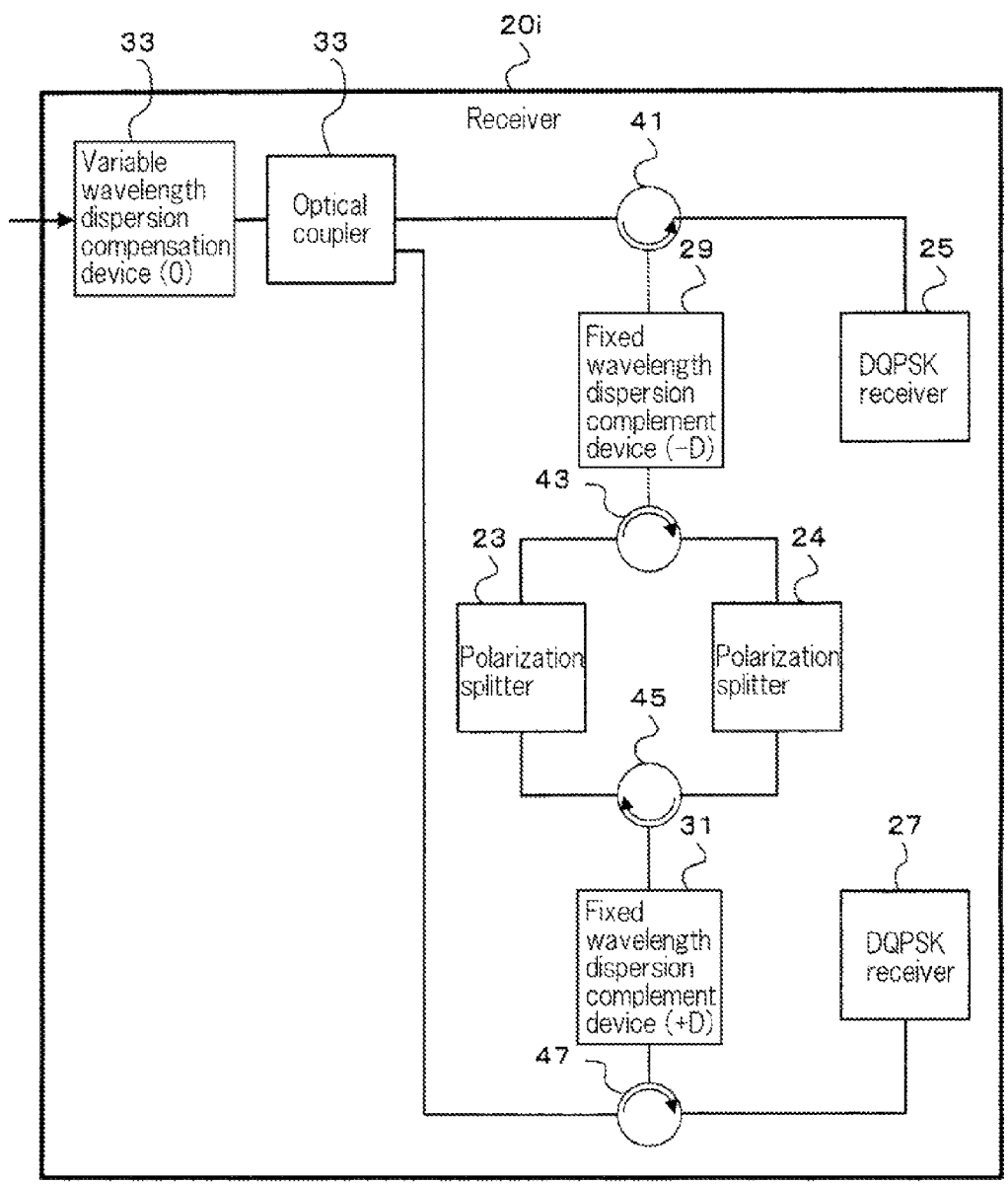
FIG. 33 is a block diagram showing the structure of a receiver according to a tenth exemplary embodiment.

A tenth exemplary embodiment that accomplishes the present invention will be described with reference to FIG. 33. FIG. 33 is an overall schematic diagram showing the structure of receiver 20i according to this exemplary embodiment. Referring to the drawing, receiver 20i is different from receiver 20g according to the eighth exemplary embodiment in that receiver 20i is also provided with port circulators 41, 43, 45, and 47.

Optical coupler 33 outputs optical signals branched to port circulators 41 and 47.

The optical signal that is output from optical coupler 33 to port circulator 41 is input to DQPSK receiver 27 successively through fixed wavelength dispersion complement device 29, port circulator 43, polarization splitter 24, port circulator 45, fixed wavelength dispersion complement device 31, and port circulator 47.

On the other hand, the optical signal that is output from optical coupler 33 to port circulator 47 is input to DQPSK receiver 25 successively through fixed wavelength dispersion complement device 31, port circulator 45, polarization splitter 23, port circulator 43, fixed wavelength dispersion complement device 29, and port circulator 41.

As described above, according to this exemplary embodiment, although the number of fixed wavelength dispersion complement devices is decreased in comparison with the receiver according to the ninth exemplary embodiment, since optical signals pass through fixed wavelength dispersion complement devices (29 and 31) having polarities that are reverse to each other, while the cost is reduced, the reception characteristics can be improved.

Eleventh Exemplary Embodiment

Figure 34:
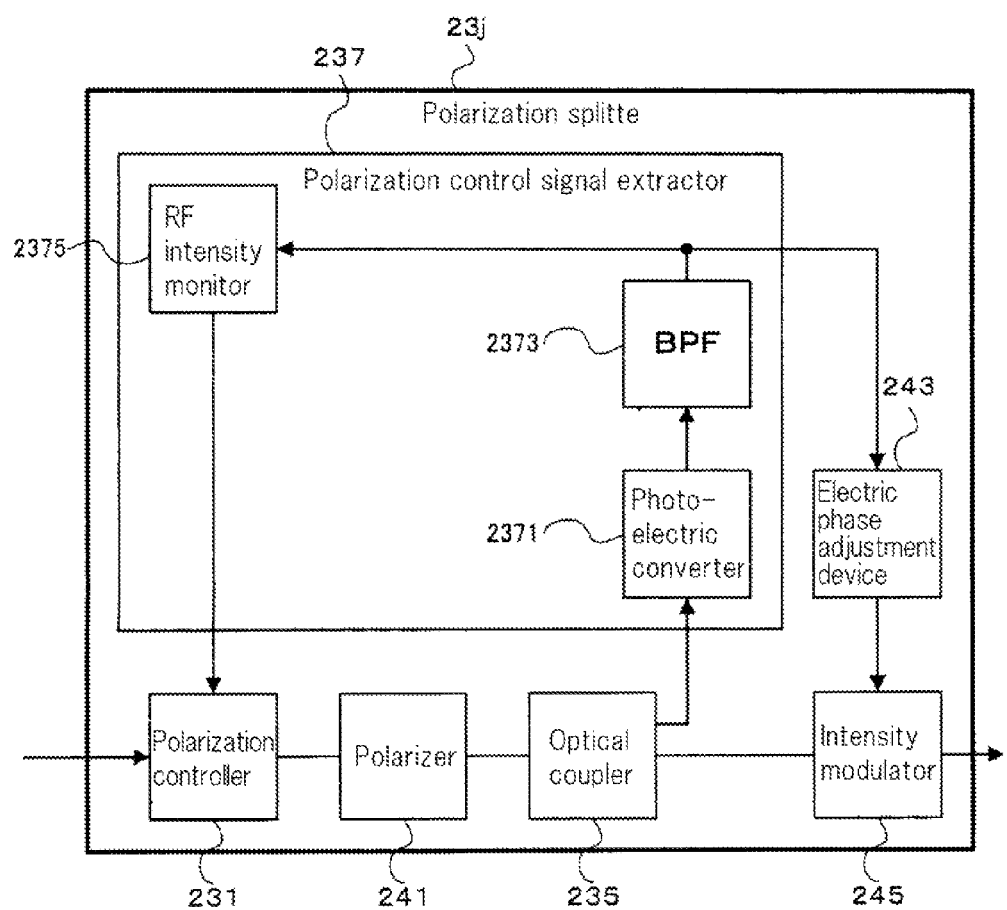
FIG. 34 is a block diagram showing the structure of a polarization splitter according to an eleventh exemplary embodiment.

An eleventh exemplary embodiment that realizes the present invention will be described with reference to FIG. 34 to FIG. 36. FIG. 34 is an overall schematic diagram showing the structure of polarization splitter 23j according to this exemplary embodiment. Referring to this drawing, polarization splitter 23j is different from polarization splitter 23 according to the first exemplary embodiment in that polarization demultiplexer 23j is provided with polarizer 241 and intensity modulator 245 instead of polarization beam splitter 233 and performs time gating.

Time gating is a technique that suppresses a crosstalk component by intensity-modulating a signal light with a symbol-speed sine wave and selectively suppresses only energy that is nearly at the end of each symbol. In this exemplary embodiment, since transmitter 10 performs asymmetrical chirping, the center of energy of each symbol of one of both polarization components deviates for a half symbol period from that of the other polarization component. Thus, even if cross talk takes place due to polarization dispersion, the energy of a crosstalk component that leaks out concentrates nearly at the end of each symbol. By performing time gating that removes this portion, polarization splitter 23j can effectively suppress the crosstalk component.

According to this exemplary embodiment, by performing asymmetrical chirping, a polarization component in which pulses are compressed or extract a polarization component in which pulses are expanded is output at the end of each symbol slot from transmitter 10. Thus, time gating can be used to either suppress only a polarization component in which pulses are compressed and extract a polarization component in which pulses are expanded or, in contrast, suppress only a polarization component in which pulses are expanded and extract a polarization component in which pulses are compressed.

In the system that suppresses only a polarization component in which pulses are compressed, although the suppression of the polarization component is limited, the insertion loss becomes small. By contrast, in the system that suppresses only a polarization component in which pulses are expanded, although the insertion loss becomes large, a high suppression ratio can be realized.

Polarization controller 231 outputs an optical signal to polarizer 241. Polarizer 241 causes only a predetermined linear polarization component to selectively pass and outputs the selected polarization component to optical coupler 235.

Optical coupler 235 branches the optical signal that is output from polarizer 241 into two optical signals and outputs one optical signal to control signal extractor 237 and the other to intensity modulator 245.

Control signal extractor 237 inputs a part of an output of band-pass filter 2373 to electric phase adjustment device 243.

Electric phase adjustment device 243 adjusts the phase of a clock signal (drive signal) that is output from control signal extractor 231 such that intensity modulator 245 is driven at the timing at which the loss of the signal in which pulses are compressed or a signal in which pulses are expanded becomes the minimum when the signal passes through intensity modulator 245. Specifically, electric phase adjustment device 243 adjusts the phase such that pulses pass at the timing at which the passage loss of intensity modulator 245 becomes minimum and in which the passage loss becomes the maximum at the end of each symbol.

Intensity modulator 245 intensity-modulates the optical signal that is output from optical coupler 235 in synchronization with a clock signal that is adjusted by electric phase adjustment device 243 and outputs the resultant signal to DQPSK receiver (25 or 27).

Figure 35:
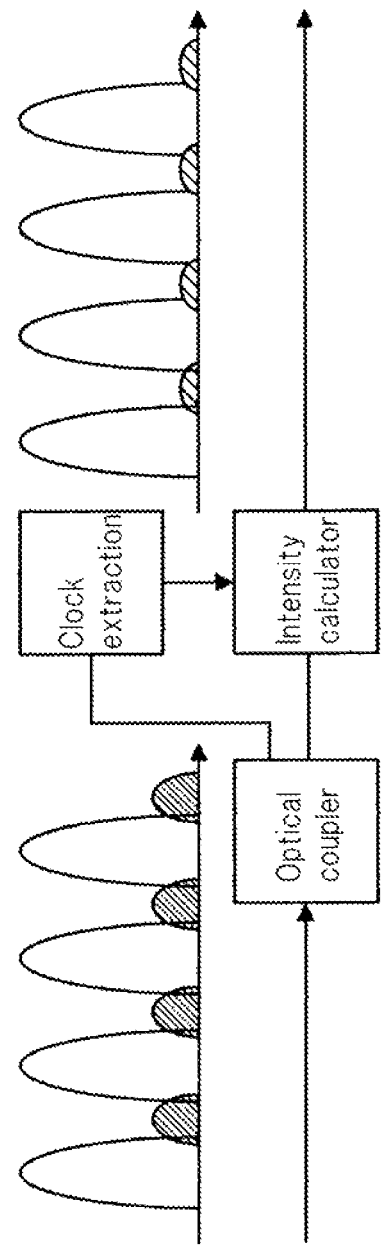
FIG. 35 is a schematic diagram describing the operation of a polarization splitter according to the first exemplary embodiment.

FIG. 35 is a schematic diagram describing the operation of polarization splitter 23j. As shown in the drawing, time gating allows a crosstalk component (hatched portions) to be effectively suppressed.

Figure 36:
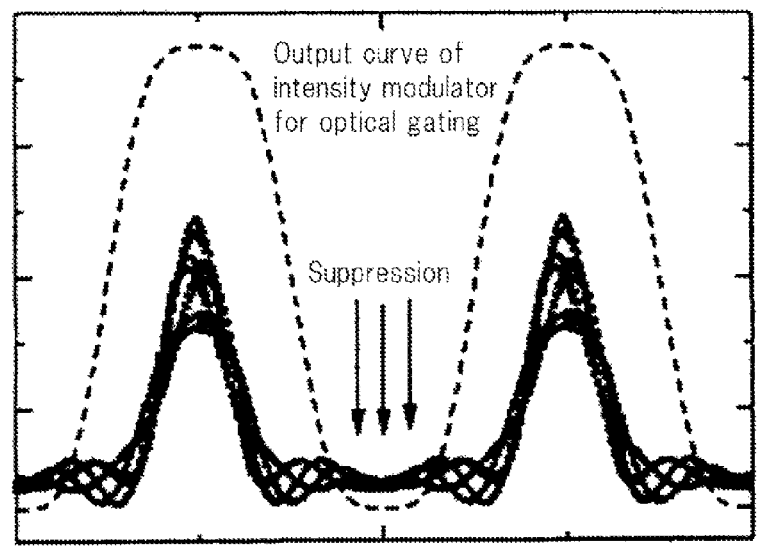
FIG. 36 is a schematic diagram showing the waveforms of optical signals before and after time gating according to the eleventh exemplary embodiment.

FIG. 36 is a schematic diagram showing a waveform in the case in which a polarization component in which pulses are expanded is selectively suppressed by time gating. In this drawing, a solid line represents a waveform of a signal light before time gating is performed, whereas a dotted line represents a waveform of an intensity modulator drive signal with which time gating is performed. In the drawing, the vertical axis represents signal intensity, whereas the horizontal axis represents time axis. As shown in the drawing, a component in which pulses are expanded is selectively suppressed at the end of a symbol slot denoted by arrows.

Figure 37:
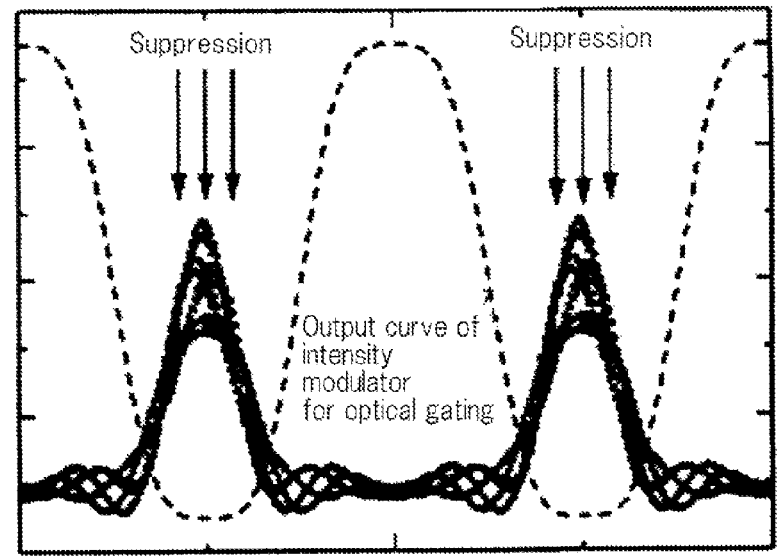
FIG. 37 is a schematic diagram showing the waveforms of an optical signal before and after time gating according to the eleventh exemplary embodiment.

FIG. 37 is a schematic diagram showing a waveform in the case in which a polarization component in which pulses are compressed is selectively suppressed by time gating. In the drawing, the solid line represents a waveform of a signal light before time gating is performed, whereas the dotted line represents a waveform of an intensity modulator drive signal with which time gating is performed. In the drawing, the vertical axis represents signal intensity, whereas the horizontal axis represents time axis. As shown in the drawing, a component in which pulses are compressed is selectively suppressed at the end of a symbol slot denoted by arrows.

Figure 38:
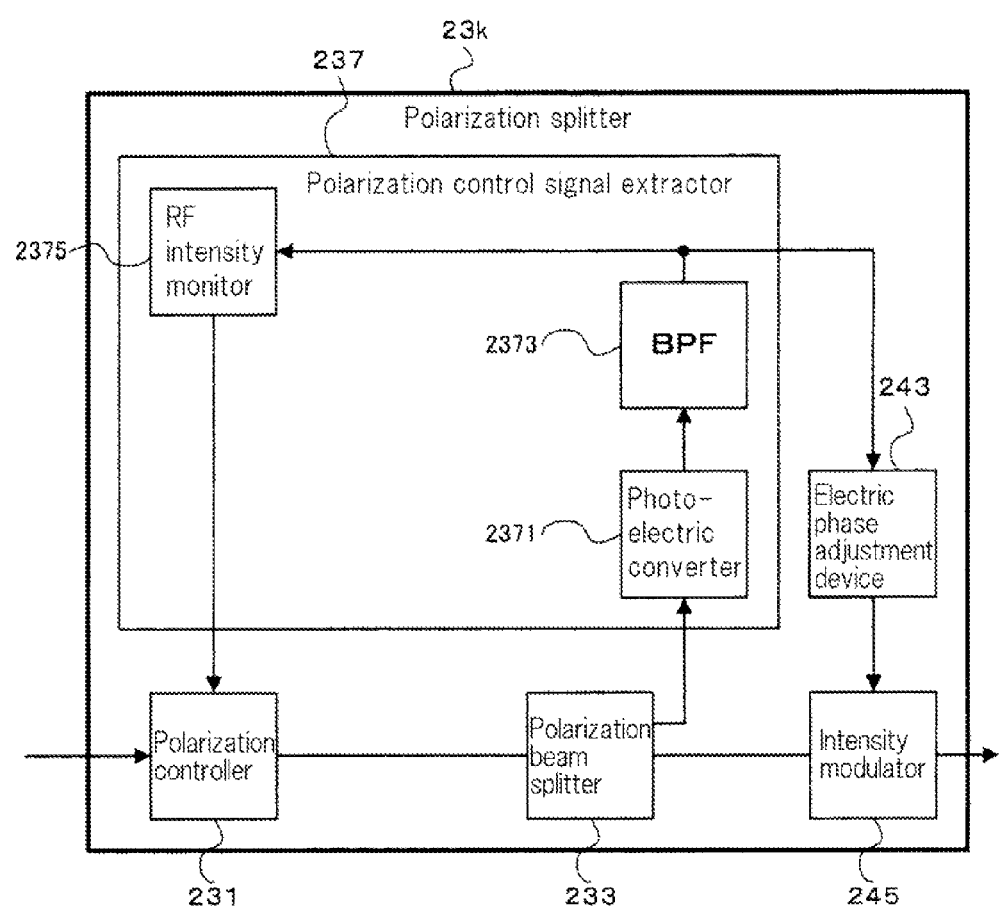
FIG. 38 is a block diagram showing the structure of a polarization splitter according to a modification.

Alternatively, as shown in FIG. 38, a structure in which polarization beam splitter 233 is disposed instead of polarizer 241 and optical coupler 235, such that polarization beam splitter 233 outputs optical signals to polarization control signal extractor 237 and intensity modulator 245, may be used.

As described above, according to this exemplary embodiment, since a polarization component in which pulses are expanded is suppressed by time gating, polarization splitter 23j can extract a polarization component in which pulses are compressed. Thus, polarization splitter 23j can effectively remove a crosstalk and accomplish a high suppression ratio.

In contrast, since a polarization component in which pulses are compressed is suppressed by time gating, polarization splitter 23j can effectively extract a polarization component in which pulses are expanded. Thus, polarization splitter 23j can effectively remove a crosstalk and decrease the passage loss of the polarization splitter.

Now, with reference to the exemplary embodiments, the present invention has been described. However, it should be understood by those skilled in the art that the structure and details of the present invention may be changed in various manners without departing from the scope of the present invention.

The present application is the National Phase of PCT/JP2009/064833, filed Aug. 26, 2009, which claims a priority based on Japanese Patent Application JP 2008-26008 filed on Sep. 3, 2008, the entire contents of which are incorporated herein by reference in its entirety.

DESCRIPTION OF REFERENCE NUMERALS

1 Optical signal transmission system
10 Transmitter
20 Receiver
11 Modulation section
15 Polarization combiner
21, 22 Variable wavelength dispersion compensation device
23, 24 Polarization splitter
25, 27 DQPSK receiver
29, 31, 35, 37 Fixed wavelength dispersion complement device
41, 43, 45, 47 Port circulator
111, 113 Light source
115 Symbol frequency generator
117, 119 Intensity modulator
120 Optical coupler
121, 123 Data modulator
125, 127, 1351, 1353 Phase modulator
129 Variable optical delay adjustment device
131, 133 Amplitude modulator
135 Asymmetrically chirping RZ intensity modulator
231 Polarization controller
233 Polarization beam splitter
235 Optical coupler
236 Fixed wavelength dispersion complement device
237 Polarization control signal extractor
2371 Photo-electric converter
2373 Band-pass filter
2375 RF intensity monitor
241 Polarizer
243 Electric phase modulator
245 Intensity modulator
S1 to S7, T1 to T5 Step

What is claimed is:

1. An optical signal transmission system, comprising:
a transmitter that phase-modulates two optical signals of a same frequency by asymmetrically chirping the two optical signals, combines the two optical signals that have been phase-modulated as polarization components according to polarization multiplexing, and transmits an optical signal that has been combined and obtained; and
a receiver that receives said optical signal from said transmitter, compresses pulses of at least one of the polarization components of the optical signal, and splits the optical signal into two polarization components.

2. A transmitter, comprising:
a phase modulation section that phase-modulates two optical signals of a same frequency by adding asymmetrically chirping the two optical signals; and
a transmission section that combines said two optical signals that have been phase-modulated by said phase modulation section as polarization components according to polarization multiplexing, and transmits an optical signal that has been combined and obtained.

3. The transmitter as set forth in claim 2,
wherein said phase modulation section comprises:
a clock signal generation section that generates two clock signals having phases that are different from each other by 180 degrees; and
a chirping section that chirps said two optical signals in synchronization respectively with said clock signals generated by said clock signal generation section.

4. The transmitter as set forth in claim 2,
wherein said phase modulation section comprises:
a clock signal generation section that generates two clock signals of different voltage amplitudes such that said two optical signals have phases that are different from each other by 180 degrees; and
a chirping section that chirps said two optical signals in synchronization respectively with said clock signals generated by said clock signal generation section.

5. The transmitter as set forth in claim 2,
wherein said chirping section chirps said two optical signals with a same depth of $0.5\pi$ to $1.0\pi$.

6. The transmitter as set forth in claim 2, further comprising:
a data modulation section that data-modulates said optical signals.

7. A receiver, comprising:
a reception section that receives an optical signal in which two optical signals that have a same frequency and that are phase-modulated according to the method of adding asymmetrically chirping to the two optical signals have been polarization multiplexed;
a pulse compression section that compresses pulses of at least one of polarization components of said optical signal that has been received by said reception section; and
a polarization splitting section that splits said optical signal that has been received by said reception section into two polarization components.

8. The receiver as set forth in claim 7,
wherein said pulse compression section causes a wavelength dispersion of a first polarity to take place in at least one of said two polarization components that have been split by said polarization splitting section such that pulses are compressed.

9. The receiver as set forth in claim 8,
wherein said pulse compression section further causes a wavelength dispersion of a polarity that is the reverse of said first polarity to take place in another polarization component of said two polarization components.

10. The receiver as set forth in claim 8,
wherein said pulse compression section compensates for a wavelength of said optical signal such that a wavelength dispersion value substantially becomes 0 by using a variable wavelength dispersion compensation device; and
said polarization splitting section splits said optical signal in which the wavelength dispersion was caused to take place by said pulse compression section into said two polarization components.

11. The receiver as set forth in claim 10,
wherein said pulse compression section causes said wavelength dispersion to take place using a fixed wavelength dispersion complement device that causes a wavelength dispersion having a predetermined wavelength dispersion value to take place.

12. The receiver as set forth in claim 7, further comprising:
a branch section that branches said optical signal received by said reception section into two optical signals, wherein said pulse compression section causes a wavelength dispersion of a first polarity to take place in one of said two optical signals that have been branched by said branch section such that pulses are compressed, and wherein said polarization splitting section extracts one polarization component in which pulses have been compressed from said one optical signal in which the wavelength dispersion of the first polarity was caused to take place by said pulse compression section.

13. The receiver as set forth in claim 12, wherein said pulse compression section causes a wavelength dispersion of a polarity that is the reverse of said first polarity to take place in said one polarization component that has been extracted by said polarization splitting section.

14. The receiver as set forth in claim 13, wherein said pulse compression section causes the wavelength dispersion to take place in said polarization component using a fixed wavelength dispersion complement device that causes said wavelength dispersion having a predetermined wavelength dispersion value to take place.

15. The receiver as set forth in claim 12, wherein said pulse compression section causes a wavelength dispersion of a polarity that is the reverse of said first polarity to take place in another optical signal of said two optical signals, and wherein said polarization splitting section extracts another polarization component from the other optical signal in which the wavelength dispersion of said reverse polarity was caused to take place by said pulse compression section.

16. The receiver as set forth in claim 15, wherein said pulse compression section causes the polarization dispersion of said first polarity to take place in said other polarization component that has been extracted by said polarization splitting section.

17. The receiver as set forth in claim 12, wherein said pulse compression section causes a wavelength dispersion to take place in said optical signal received by said reception section using a variable wavelength dispersion compensation device such that the wavelength dispersion value becomes 0, and wherein said branch section branches said optical signal in which the wavelength dispersion has been caused to take place by said pulse compression section into said two optical signals.

18. The receiver as set forth in claim 17, wherein said pulse compression section causes the wavelength dispersion to take place in said optical signal using a fixed wavelength dispersion device that causes a wavelength dispersion having a predetermined wavelength dispersion value to take place.

19. The receiver as set forth in claim 7, wherein said polarization splitting section causes a polarization component in which a stroke takes place in the two split polarization components to be time-gated to suppress the polarization component.

20. An optical signal transmission method, comprising:

phase-modulating two optical signals of a same frequency by asymmetrically chirping the two optical signals;

combining the two optical signals that have been phase-modulated as polarization components according to polarization multiplexing, and transmitting an optical signal that has been combined and obtained;

receiving said optical signal; and compressing pulses of at least one of the polarization components of the optical signal and splitting the optical signal into two polarization components.

* * * * *